United States Patent
Sypeck et al.

(10) Patent No.: US 7,963,085 B2
(45) Date of Patent: Jun. 21, 2011

(54) MULTIFUNCTIONAL PERIODIC CELLULAR SOLIDS AND THE METHOD OF MAKING SAME

(75) Inventors: David J. Sypeck, Daytona Beach Shores, FL (US); Haydn N. G. Wadley, Keswick, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 2473 days.

(21) Appl. No.: 10/479,833

(22) PCT Filed: Jun. 6, 2002

(86) PCT No.: PCT/US02/17942
§ 371 (c)(1),
(2), (4) Date: Dec. 5, 2003

(87) PCT Pub. No.: WO02/098644
PCT Pub. Date: Dec. 12, 2002

(65) Prior Publication Data
US 2004/0154252 A1 Aug. 12, 2004

Related U.S. Application Data

(60) Provisional application No. 60/296,186, filed on Jun. 6, 2001.

(51) Int. Cl.
*E04C 5/00* (2006.01)
(52) U.S. Cl. .................. 52/782.1; 52/652.1; 52/654.1
(58) Field of Classification Search ............ 52/782.1, 52/652.1, 654.1, 633; 428/137
See application file for complete search history.

(56) References Cited

U.S. PATENT DOCUMENTS

| | | | |
|---|---|---|---|
| 1,613,788 A * | 1/1927 | Frease et al. | 52/652.1 |
| 2,288,104 A | 6/1942 | Pasquier | |
| 3,086,899 A * | 4/1963 | Ingraham et al. | 428/158 |
| 3,783,969 A | 1/1974 | Pall | |
| 3,795,288 A | 3/1974 | Pall | |
| 3,996,082 A | 12/1976 | Leatherman | |
| 4,130,233 A | 12/1978 | Chisholm | |
| 4,153,311 A * | 5/1979 | Takahashi | 312/107 |
| 4,223,053 A | 9/1980 | Brogan | |
| 4,291,732 A | 9/1981 | Artzer | |

(Continued)

*Primary Examiner* — Basil Katcheves
(74) *Attorney, Agent, or Firm* — Novak Druce DeLuca + Quigg LLP; Robert J. Decker

(57) ABSTRACT

Methods of making truss-based periodic cellular solids that have improved structural properties and multifunctional design. Many materials (metals, ceramics, glasses, polymers, composites and even semiconductors) can be shaped into cellular, truss-like architectures with open, closed or mixed types of porosity and then very uniformly arranged in controlled, three-dimensional space-filling arrays. The truss-like elements do not necessarily have a constant cross-section, nor are they necessarily straight or solid throughout (they could be hollow). Their cross sections can be circular, square, triangular, I-beam or other shapes of interest depending on multifunctional needs. When bonded together by solid state, liquid phase, pressing or other methods at points of contact, a cellular structure of highly repeatable cell geometry and few imperfections results. The bonds hold the truss elements together in a desired configuration, allow load to be efficiently transferred amongst them and make the resulting structure significantly more rigid when bent, compressed or sheared. These constructed cellular solids offer a broad range of multifunctional structural uses with a tremendous freedom for choosing the truss type, orientation and distribution. Multiple materials can be intermixed.

26 Claims, 18 Drawing Sheets

U.S. PATENT DOCUMENTS

| | | | |
|---|---|---|---|
| 4,393,987 A * | 7/1983 | Anderson et al. | 228/157 |
| 4,419,321 A * | 12/1983 | Hardigg | 264/328.12 |
| 4,450,338 A | 5/1984 | Conn | |
| 4,531,511 A | 7/1985 | Hochberg | |
| 4,625,710 A | 12/1986 | Harada | |
| 4,756,943 A | 7/1988 | Koletzko | |
| 4,859,541 A | 8/1989 | Maxeiner | |
| 4,923,544 A | 5/1990 | Weisse | |
| 5,070,673 A | 12/1991 | Weisse | |
| 5,102,723 A | 4/1992 | Pepin | |
| 5,360,500 A | 11/1994 | Evans | |
| 5,471,905 A | 12/1995 | Martin | |
| 5,503,887 A | 4/1996 | Diaz | |
| 5,527,590 A | 6/1996 | Priluck | |
| 5,547,737 A | 8/1996 | Evans | |
| 5,624,622 A | 4/1997 | Boyce | |
| 5,654,518 A | 8/1997 | Dobbs | |
| 5,679,467 A | 10/1997 | Priluck | |
| 5,741,574 A | 4/1998 | Boyce | |
| 5,958,551 A * | 9/1999 | Garcia-Ochoa | 428/137 |
| 5,962,150 A | 10/1999 | Priluck | |
| 6,076,324 A | 6/2000 | Daily | |
| 6,080,495 A | 6/2000 | Wright | |
| 6,170,560 B1 * | 1/2001 | Daily et al. | 164/516 |
| 6,189,286 B1 | 2/2001 | Seible | |
| 6,200,664 B1 | 3/2001 | Figge | |
| 6,207,256 B1 * | 3/2001 | Tashiro | 428/178 |
| 6,284,346 B1 | 9/2001 | Sheridan | |
| 6,644,535 B2 | 11/2003 | Wallach et al. | |
| 6,993,879 B1 * | 2/2006 | Cantley | 52/652.1 |
| 2002/0170265 A1 | 11/2002 | Tokonabe | |
| 2003/0049537 A1 | 3/2003 | Wadley | |

* cited by examiner

Hexagonal designated sheet
Square designated sheet
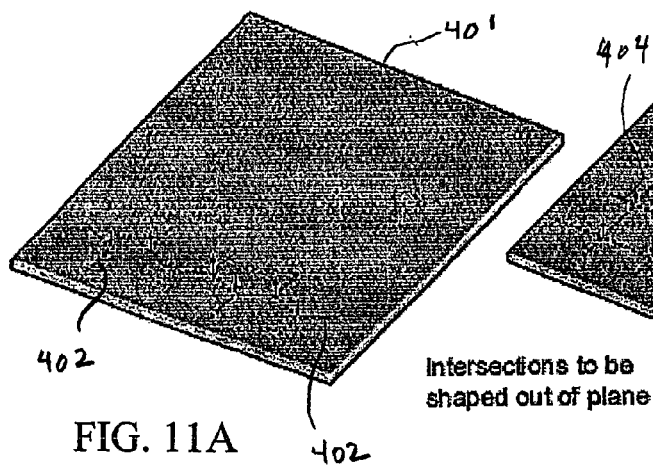
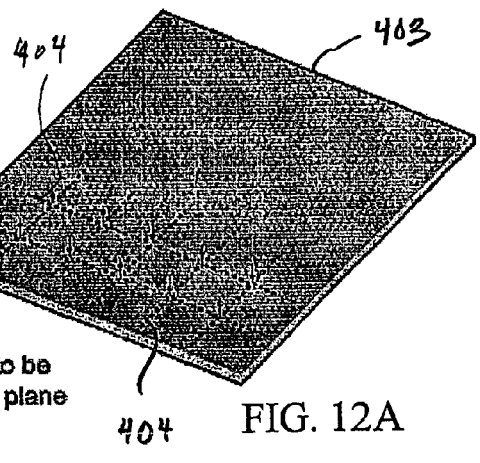
Intersections to be shaped out of plane
FIG. 11A
FIG. 12A
Designated sheet after shaping
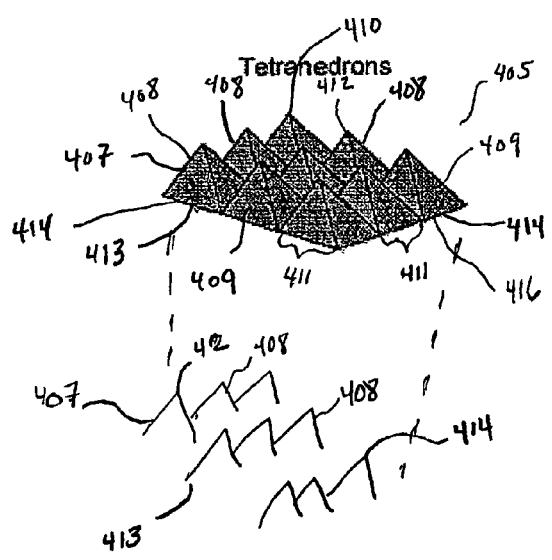
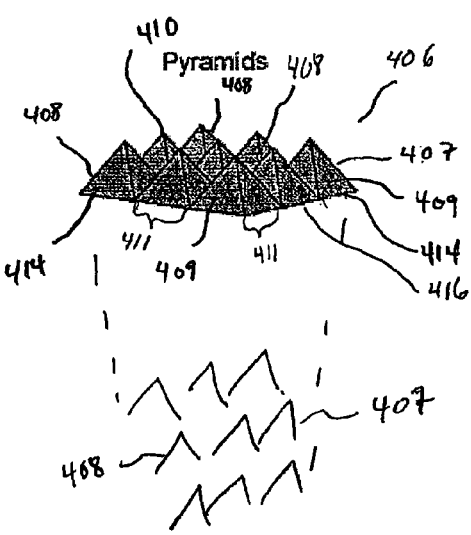
FIG. 11B
FIG. 12B Hexagonal apertured sheet
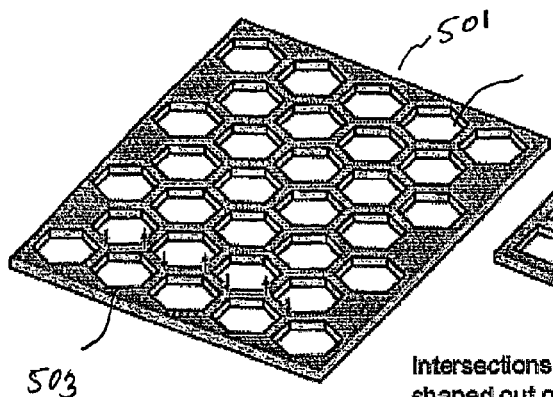
Square apertured sheet
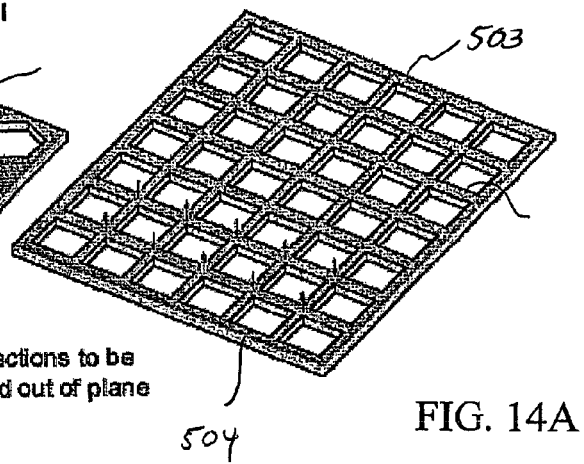
Intersections to be shaped out of plane
FIG. 13A
FIG. 14A
Apertured sheet after shaping
Tetrahedrons
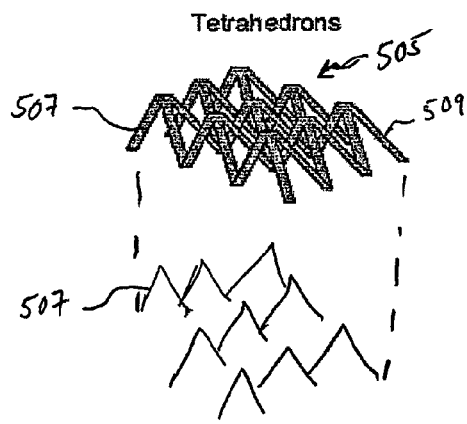
Pyramids
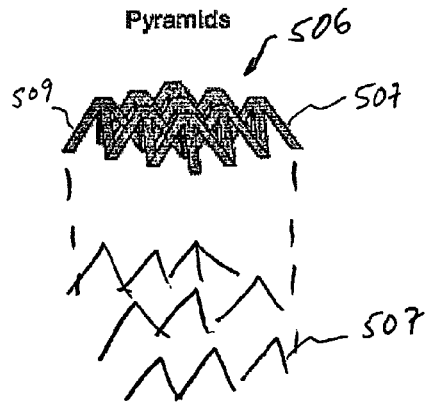
FIG. 13B
FIG. 14B Spot bonded perforated sheet Expansion to a truss core panel Metallurgically bonded metal panel Metal fillet (brazing)

Braze alloy powder
Heat

Clad braze alloy
Heat

Pressure
Heat

Wrought metal micro-truss (tetrahedral)

Material: 304 stainless steel
Tetrahedron height: ~9 mm (roughly)
Leg width: ~1.25 mm
Leg thickness: ~0.57 mm
Relative density: ~1.6%

Wrought metal truss core sandwich panel (tetrahedral truss core)

Core:
Material: 304 stainless steel
Tetrahedron height: ~9 mm (roughly)
Leg width: ~1.25 mm
Leg thickness: ~0.57 mm
Relative density: ~1.6%

Facesheets:
Material: 304 stainless steel
Thickness: ~0.635 mm

Bonding:
Braze alloy: Ni-25Cr-10P powder
Process: 1120°C for 2 hr in vacuum (P< $10^{-3}$ torr)

MULTIFUNCTIONAL PERIODIC CELLULAR SOLIDS AND THE METHOD OF MAKING SAME

RELATED APPLICATIONS

This application is a national stage filing of International Application No. PCT/PCT/US02/17942, filed 6 Jun. 2002, which claims benefit under 35 U.S.C. Section 119(e) priority from U.S. Provisional Patent Application Serial, No. 60/296,186 filed on Jun. 6, 2001, entitled "Constructed Cellular Solids and the Method of Making thereof," the entire disclosures of which are hereby incorporated by reference herein in their entirety.

GOVERNMENT SUPPORT

Work described herein was supported by Federal Grant Nos. N00014-96-1-1028 and N00014-01-1-0517, awarded by DARPA/ONR. The United States Government has certain rights in the invention.

FIELD OF INVENTION

The present invention relates generally to improved structural/multifunctional material designs and methods for their manufacture. More particularly, the invention is directed to the use of trusses, plates, strips, sheets and bonding techniques to form periodic cellular solids.

BACKGROUND OF THE INVENTION

The properties of a cellular solid are sensitive to both the topology of the cell material and its properties. For manufacturers, the main obstacle to obtaining superior properties has involved gaining good control over the distribution of material at the cell level in a cost effective way. As such, the most common and least expensive synthetic cellular solids remain stochastic in nature; made by variants of foaming in the liquid, solid or semi-solid state [1]. Other methods involve the solidification of liquids containing dissolved gases, bonding of hollow spheres, vapor deposition onto sacrificial templates, or investment casting using a stochastic cellular structure mold. These types of manufacturing approaches lead to cellular architectures with open, closed or mixed types of porosity.

Foaming results in cell architectures that are predominantly closed cell, often with wide distributions of cell size and many imperfections. Closed cell stochastic foams are used for sound attenuation and impact energy absorption. Open cell stochastic foams can be made using reticulated polymer foam templates. In one approach, the template is used as the pattern for an investment casting mold which is then filled with a liquid (e.g. molten metal) and solidified. In others, a vapor or fine powder slurry is deposited directly on to the template. In the latter, a subsequent heat treatment removes the organic compounds and densifies the structure. Open cell stochastic metal foams are used for lightweight heat exchangers and as the electrodes in nickel metal hydride batteries. However, their utility as load bearing structures is substantially reduced with decreasing relative density as the Young's and shear moduli along with the tensile, compressive and shear yield strengths degrade in a non-linear way (owing to ligament failure in bending). This is also true for the closed cell stochastic foams. Nonetheless, these stochastic cellular materials still look to be structurally competitive when used as the cores of sandwich panels (especially in biaxial loading) [7].

Finite-element analysis of structural configurations that give the highest weight specific stiffness lead to a truss-like cellular structure when the solid volume fraction is small. Researchers in the field of cellular solids have now begun to concentrate on an open periodic cell lattice (trusses). Small polymeric, ceramic and metallic trusses of this type are currently manufactured using rapid proto-typing or injection molding techniques. For example, by fabricating a polymer or wax pattern of the appropriate truss architecture, miniature metal trusses follow by investment casting. The resulting structures are known as lattice block or truss materials. Individual cells can be small (a few mm). By manipulating the truss architecture, properties can be widely modified. Like proven truss designs, the Young's and shear moduli along with the tensile, compressive and shear yield strengths of these materials vary with relative density in a linear way (trusses are in tension/compression with no bending). This becomes especially important at low relative density where properties far exceed those of stochastic cellular solids. These are just a few of the benefits to be gained when good control over the distribution of material at the cell level is achieved.

However, the casting approaches used to manufacture miniature trusses are expensive and the resulting structures are subject to large (2-3) knockdown by casting factors (e.g., entrapped porosity, shrinkage residual stress, etc.). Furthermore, many materials of potential interest are difficult to cast and do not favorably respond to post-processing (e.g. heat treatment).

Moreover, both stochastic and periodic cellular metals have attracted interest as alternatives to honeycomb when used as the cores of sandwich structures designed to support in-plane compressive or bending loads [1]. For successful implementation, these cellular metal based approaches must compete against established panel stiffening and strengthening concepts. Conventional panel stiffening involves the attachment of stringers that increase the polar and second moment of cross-section area with modest added weight [1]. Panels of this type are often made by machining stiffeners from thick blanks and fastening to a sheet. When fabricated in this way, the panels can be quite light and stiff however, they also show substantial anisotropy in the bending plane and are relatively expensive due to the poor utilization of material and high machining cost.

Other ways to stiffen a panel involve waffling or sandwich construction [1-4]. For the latter, thin strong skins are bonded to the sides of a lightweight core 3 as shown in FIG. 1. Like the flanges of an I-beam, the skins 4 provide support in bending with one skin in compression and the other in tension. The core functions in a manner similar to the web of an I-beam. That is, it resists shear and compressive loads while separating the skins far apart to generate a high second moment cross-section area and therefore high rigidity.

Honeycomb core sandwich structures 2 are the current state-of-the-art choice for weight sensitive applications such as aircraft and satellite structures [2]. But there are difficulties with forming them into complex (non-planar) shapes due to induced anticlastic curvature [2]. Also, the closed nature of the porosity can trap moisture leading to corrosion. In space applications, their skins are susceptible to interfacial debonding.

Open cell cores based upon tetrahedral truss concepts [5,6] allow fluids to readily pass through which could make them less susceptible to internal corrosion and depressurization induced delamination. When used as sandwich cores, they are more amenable to shaping into complex shapes. They are also attractive for multifunctional applications such as cross flow heat exchangers due to the interconnected nature of the porosity [1].

Multifunctional materials designers seek to tailor load support properties of interest (e.g. stiffness and strength) in the most efficient way through adjustment of the open cell topology, relative density and material type. The intervening space can then be used for other functionalities [7]. For example, the porosity within a load supporting cellular metal structure could also be used to simultaneously enhance impact/blast energy absorption [8,9], noise attenuation [8], catalytic activity [8], filtration efficiency [8], electrical energy storage [10] or act as the host for the in-growth of biological tissue [11]. Stochastic open cell foams have been proposed for sandwich structure cores but their mechanical properties are inferior to honeycomb [1]. FIG. 2 is a graphical representation that summarizes the Young's and shear moduli relative density relationships for various cellular concepts.

The elastic moduli of stochastic open cell foams are considerably lower than those of regular hexagonal honeycomb at low relative density. Similar trends are seen with the yield strength. These differences are a consequence of ligament bending [12]. For improved core performance, cellular topologies that deform by means of ligament stretching or compressing are preferred [7]. A prototypical example is the tetrahedral truss sandwich core [13] made by investment casting. However, high quality structures of this type are difficult to fabricate in miniature size at acceptable cost.

There exist a need in the art for methods for making multifunctional truss-based periodic cellular solids that are near the theoretical maximum stiffness and strength for a cellular solid, yet is characterized by low production costs. Accordingly, the present invention truss-based cellular solids provides a host of new and interesting multifunctional structures that could be made. The present invention provides cost effective ways of making high quality truss-based cellular solids of this type that overcomes many obstacles of the prior art. The present inventors have recently suggested a textile-based approach—as shown in pending co-assigned PCT International Application No. PCT/US01/17363, entitled "Multifunctional Periodic Cellular Solids And The Method Of Making Thereof," filed on May 29, 2001, of which is hereby incorporated by reference herein—and now provide with the present invention another way that includes closed and mixed types of porosity along with the open type. Metals, ceramics, glasses, polymers, composites and even semiconductors can all be fabricated by the present invention method. For example, for metals there is provided a perforation and deformation process followed by transient liquid phase bonding. With the new approach, miniature truss-like structures with exceptional strength/weight ratios for multifunctional structural applications are readily made at acceptable cost. The cores of these structures are bonded to thin metal facesheets using the transient liquid phase approach. These structures can be planar or curved and can be bonded to themselves, facesheets or other structures using the transient liquid phase or other bonding approaches.

SUMMARY OF THE INVENTION

The present invention provides methods of making truss-based periodic cellular solids that have improved structural properties and multifunctional design. The present invention provides many materials (metals, ceramics, glasses, polymers, composites and even semiconductors) that can be shaped into cellular, truss-like architectures with open, closed or mixed types of porosity and then very uniformly arranged in controlled, three-dimensional space-filling arrays. The truss-like elements do not necessarily have a constant cross-section, nor are they necessarily straight or solid throughout (they could be hollow). Their cross sections can be circular, square, triangular, I-beam or other shapes of interest depending on multifunctional needs. When bonded together by solid state, liquid phase, pressing or other methods at points of contact, a cellular structure of highly repeatable cell geometry and few imperfections results. The bonds hold the truss elements together in a desired configuration, allow load to be efficiently transferred amongst them and make the resulting structure significantly more rigid when bent, compressed or sheared. These constructed cellular solids offer a broad range of multifunctional structural uses with a tremendous freedom for choosing the truss type, orientation and distribution. Multiple materials can be intermixed. In preferred embodiments, core relative densities is less than about 20%. Truss diameters are greater than about 0.01 inch. Yet other ranges are contemplated as would be appreciated by one skilled in the art. This creates many opportunities for optimally designed cellular solids with multifunctional possibilities.

In one aspect, the present invention provides a truss structure comprising:

N number (N≧1) of vertically stacked three-dimensional space filling layers, wherein each of said three-dimensional space filling layers comprise:

an array of out-of-plane truss units, said units comprising at least three leg members, said legs intersecting at an upper node, and distal from said upper node are lower nodes;

said truss units connecting to nearest laterally adjacent units at lower nodes;

said upper nodes are vertically aligned with respective lower nodes of corresponding immediate adjacent said three-dimensional space filling layers;

said three-dimensional space filling layers having a top side and a bottom side;

said three-dimensional space filling layers having a perimeter with at least three perimeter sides; wherein:

at least a portion of said top side of each of said three-dimensional space filling layers for the (ith) through (Nth-1) layers comprise a top adjoining region;

at least a portion of said bottom side of each of said three-dimensional space filling layers for the (ith+1) through (Nth) layers comprise a bottom adjoining region; and wherein each of said three-dimensional space filling layers are discretely bonded to immediate vertically adjacent said three-dimensional space filling layers, wherein said discrete bonds are formed between the said top adjoining region and bottom adjoining region, wherein said bonds are formed by a bonding method selected from the group consisting of transient liquid phase bonding, solid-state diffusion bonding, brazing, soldering, chemical welding (e.g. solvents), pressing, welding, gluing, cementing or other means.

In a second aspect the present invention provides a method of making a truss structure comprising:

providing N number (N≧1) of three-dimensional space filling layers, wherein each of said three-dimensional space filling layers comprise:

an array of out-of-plane truss units, said units comprising at least three leg members, said legs intersecting at an upper node, and distal from said upper node are lower nodes;

said truss units connecting to nearest laterally adjacent units at lower nodes;

said upper nodes are vertically aligned with respective lower nodes of corresponding immediate adjacent said three-dimensional space filling layers;

said three-dimensional space filling layers having a top side and a bottom side;

said three-dimensional space filling layers having a perimeter with at least three perimeter sides; wherein:

at least a portion of said top side of each of said three-dimensional space filling layers for the (ith) through (Nth−1) layers comprise a top adjoining region;

at least a portion of said bottom side of each of said three-dimensional space filling layers for the (ith+1) through (Nth) layers comprise a bottom adjoining region; and contacting each of said three-dimensional space filling layers with immediate vertically adjacent three-dimensional space filling layers at respective said top adjoining region and said bottom adjoining region; and joining each of said contacted three-dimensional space filling layers by forming a bond at said areas of contact, wherein said bonds are formed by a bonding method selected from the group consisting of transient liquid phase bonding, solid-state diffusion bonding, brazing, soldering, chemical welding (e.g. solvents), pressing, welding, gluing, cementing or other means.

In a third aspect the present invention provides a plate or strip structure comprising:

N number (N≧1) of vertically stacked three-dimensional space filling layers, wherein each of said three-dimensional space filing layers comprise:

an array of elongated plates or strips, said plates or strips substantially planar including a first side and second side, a first lateral edge and a second lateral edge, and a first longitudinal edge and a second longitudinal edge, and wherein some of said plates or strips having slotted apertures partially extending across said sides in a lateral direction;

said plates or strips intersect with other respective plates or strips, wherein said slotted apertures at least partially allow said intersecting plates or strips to intersect there through so as to define an intersection segment; wherein at least some of said intersection segments are discretely bonded, wherein said discrete bonds are formed between said intersecting plates or strips, and wherein said bonds are formed by a bonding method selected from the group consisting of transient liquid phase bonding, solid-state diffusion bonding, brazing, soldering, chemical welding (e.g. solvents), pressing, welding, gluing, cementing or other means.

said three-dimensional space filling layers having a top side and a bottom side;

said three-dimensional space filling layers having a perimeter with at least three perimeter sides; wherein:

at least a portion of said top side of each of said three-dimensional space filling layers for the (ith) through (Nth−1) layers comprise a top adjoining region;

at least a portion of said bottom side of each of said three-dimensional space filling layers for the (ith+1) through (Nth) layers comprise a bottom adjoining region; and wherein each of said three-dimensional space filling layers are discretely bonded to immediate vertically adjacent said three-dimensional space filling layers, wherein said discrete bonds are formed between the said top adjoining region and bottom adjoining region, wherein said bonds are formed by a bonding method selected from the group consisting of transient liquid phase bonding, solid-state diffusion bonding, brazing, soldering, chemical welding (e.g. solvents), pressing, welding, gluing, cementing or other means.

In a fourth aspect the present invention provides a method of making a truss structure comprising:

providing N number (N≧1) of three-dimensional space filling layers, wherein each of said three-dimensional space filling layers comprise:

an array of elongated plates or strips, said plates or substantially planar including a first side and second side, a first lateral edge and a second lateral edge, and a first longitudinal edge and a second longitudinal edge, and wherein some of said plates or having slotted apertures partially extending across said sides in a lateral direction;

said plates or strips intersect with other respective plates or strips, wherein said slotted apertures at least partially allow said intersecting plates or strips to intersect there through so as to define an intersection segment; wherein at least some of said intersection segments are discretely bonded;

bonding said intersecting strips at said intersection segments, wherein said bonds are formed by a bonding method selected from the group consisting of transient liquid phase bonding, solid-state diffusion bonding, brazing, soldering, chemical welding (e.g. solvents), pressing, welding, gluing, cementing or other means.

said three-dimensional space filling layers having a top side and a bottom side;

said three-dimensional space filling layers having a perimeter with at least three perimeter sides; wherein:

at least a portion of said top side of each of said three-dimensional space filling layers for the (ith) through (Nth−1) layers comprise a top adjoining region;

at least a portion of said bottom side of each of said three-dimensional space filling layers for the (ith+1) through (Nth) layers comprise a bottom adjoining region;

contacting each of said three-dimensional space filling layers with immediate vertically adjacent three-dimensional space filling layers at respective said top adjoining region and said bottom adjoining region; and joining each of said contacted three-dimensional space filling layers by forming a bond at said areas of contact, wherein said bonds are formed by a bonding method selected from the group consisting of transient liquid phase bonding, solid-state diffusion bonding, brazing, soldering, chemical welding (e.g. solvents), pressing, welding, gluing, cementing or other means.

In a fifth aspect, one or more embodiments provide a method for punching or stamping the truss sheets or the like that shapes the sheet and punches the hole(s) during the same operation (e.g., CNC machines) at ambient or elevated temperature conditions.

In a sixth aspect, one or more embodiments provide a method for fabricating truss sheets. The method includes bending and punching operations that can be combined by using appropriately shaped dies and CNC machines, wherein the processes can be performed either under ambient or hot temperature conditions, and in the latter, superplastic conditions can be utilized.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIGS. 11(A) and 12(A) are schematic representations of a second aspect of the present invention wherein prior to shaping there is shown a sheet 401 containing hexagonal perforations 402 and a sheet 403 containing square perforations 404, respectively.

FIGS. 11(B) and 12(B) are schematic representations of truss structures 405, 406, formed from the hexagonal perforated 401 and square perforated sheets 403, respectively.

FIGS. 13(A) and 14(A) are schematic representations of a third aspect of the present invention, wherein prior to shaping there is shown a sheet 501 containing hexagonal apertures 502 and a sheet 503 containing square apertures 504. The cell shapes can be varied using an appropriately shaped tool.

FIGS. 13(B) and 4(B) are schematic representations of truss structures 505, 506, formed from the hexagonal perforated 501 and square perforated sheets 503, respectively.

Figure 16A:
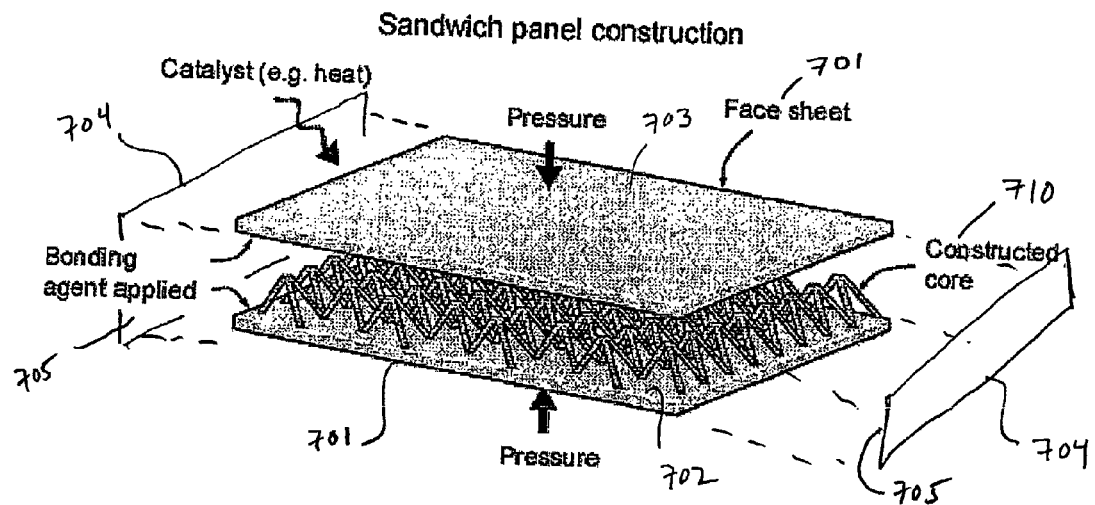

As schematically shown in FIG. 16(A), a layer-oriented solid face sheet 701 having an inner surface 702 and an outer surface 703 can be bonded to the three-dimensional space layer 710 (i.e. core).

Figure 16B:
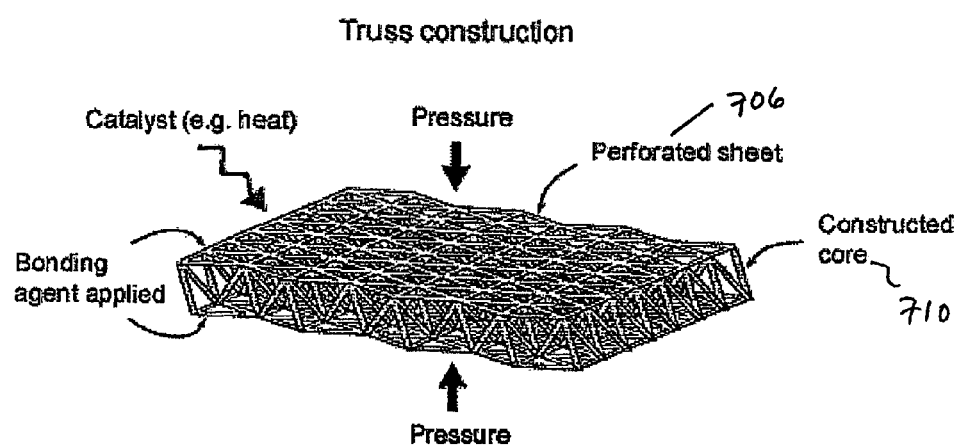

Turning to FIG. 16(B), there is shown a layer-oriented solid face sheet 706 that is bonded to the three-dimensional space layer 710 (i.e. core) wherein the face sheet 706 is a sheet having triangular shaped apertures therein.

Figure 17A:
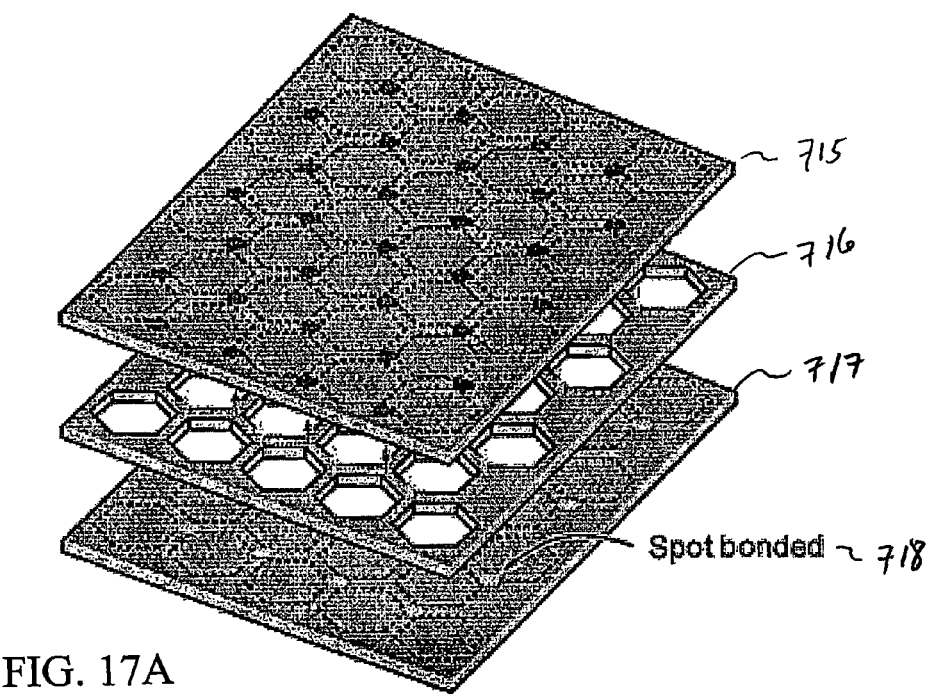
Figure 17B:
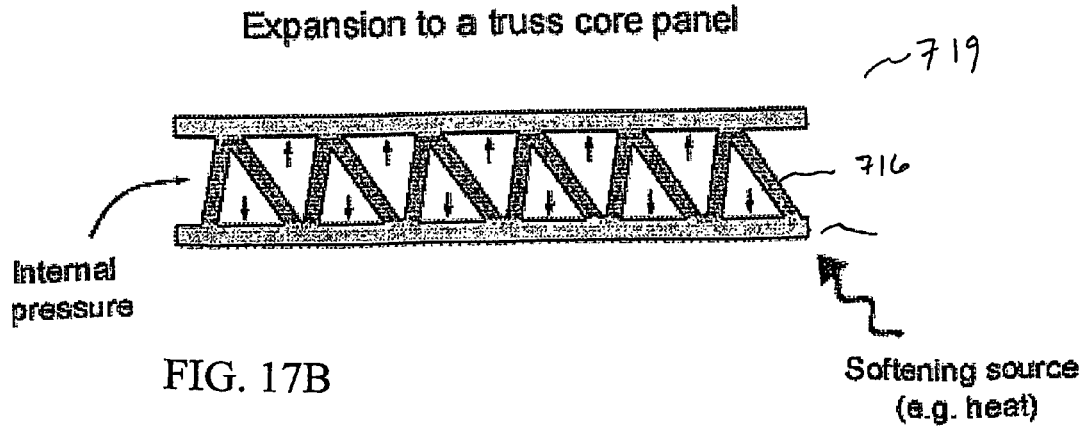

FIG. 17(A) illustrate the sheets 715, 716, 717 having spot bonds 718 prior to expansion. FIG. 17(B) illustrate the structure 719 after sheet has been-expanded and bonded to the face sheets 715, 717

FIGS. 18(A)-(F) schematically show various methods of bonding of metal trusses to solid or porous facesheets.

Figure 19A:
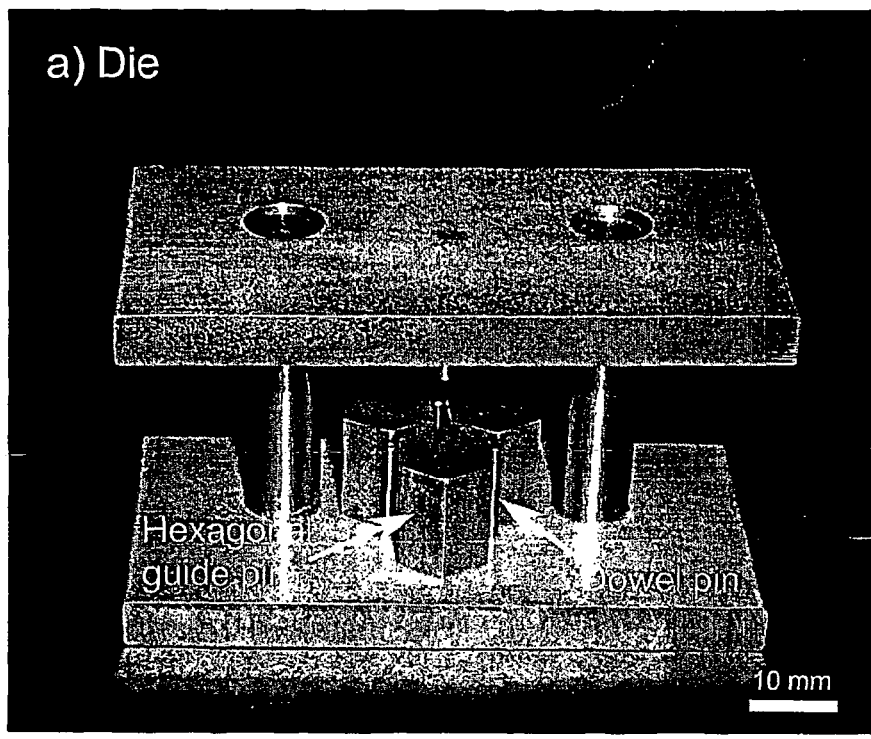

FIGS. 19(A) and 19 (B) shows a photographic depiction of an the apparatus 720 for an exemplary process to be used to fabricate sheets 720 of miniature wrought metal trusses from a perforated metal sheet.

FIGS. 20(A)-(D) are photographic depictions of the resultant three dimensional layer 722, showing the side view, first perspective view, second perspective view, respectively.

Figure 21:
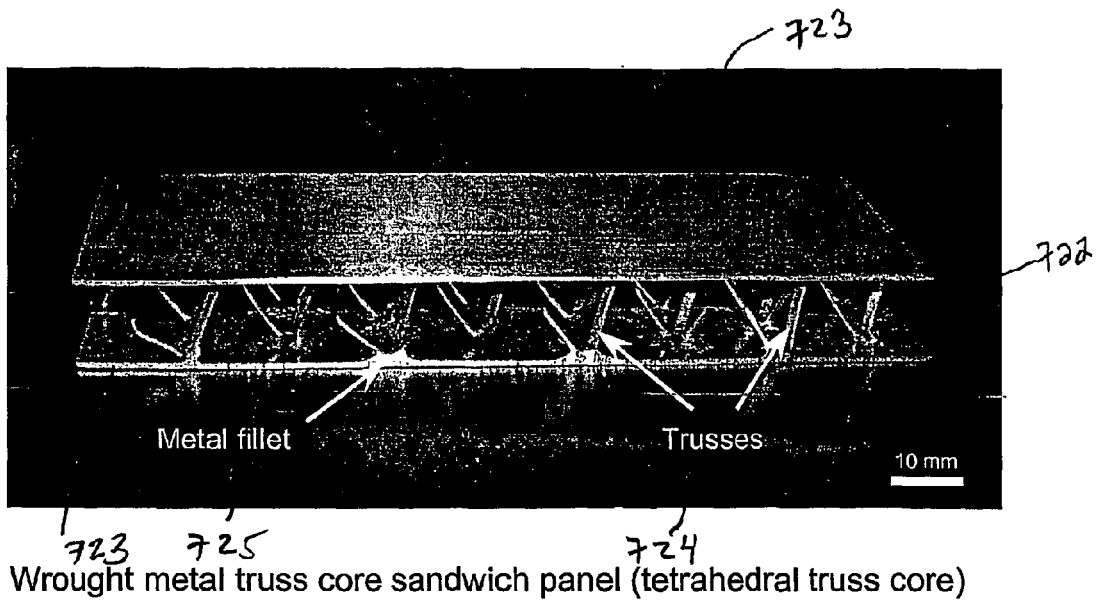

FIG. 21 is photographic depiction of the resultant miniature tetragonal truss 722 having individual tetrahedral truss units.

Figures 22A, 22B, 22C:
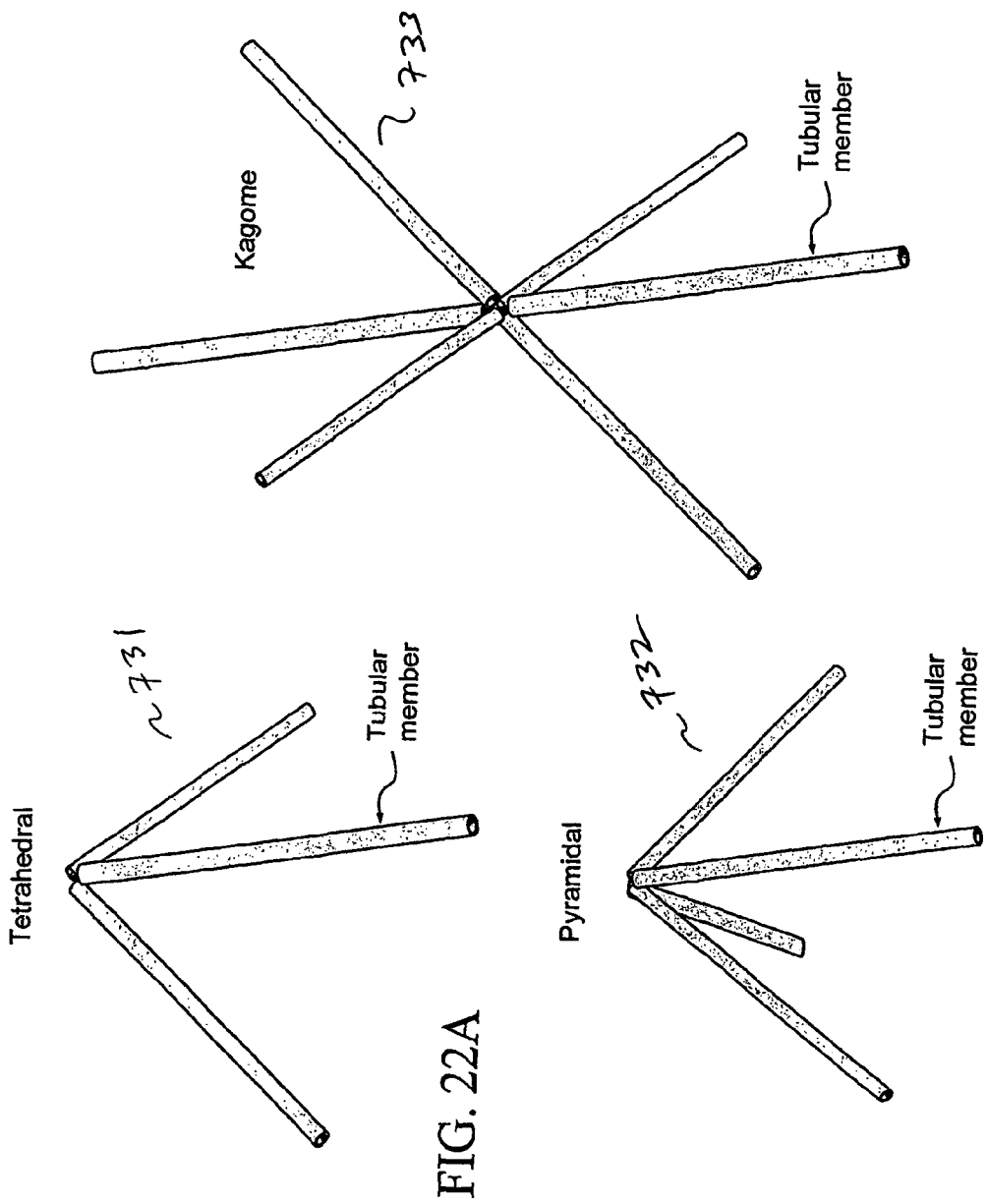

FIGS. 22(A)-(C) show exemplary truss units 731, 732, 733 that are tetrahedral, pyramidal, and kagome shaped, respectively.

Figure 23A:
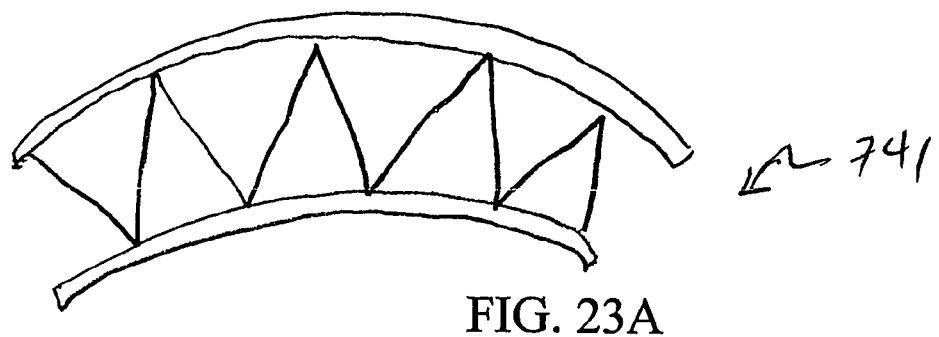

FIG. 23(A) schematically show a side view of the truss structure illustrating that, three-dimensional arrays, truss units, or sandwich structures 741 may be curved, bent, or shaped.

Figure 23B:
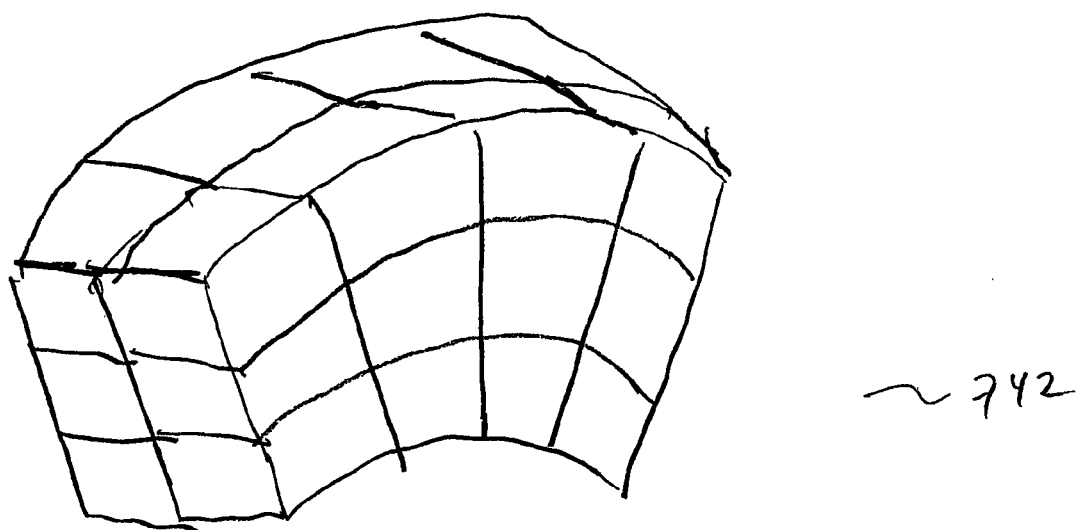

FIG. 23(B) schematically show a perspective view of a hollow cubic or rectangular structures 742 illustrating that it may be curved, bent, or shaped.

Figure 24:
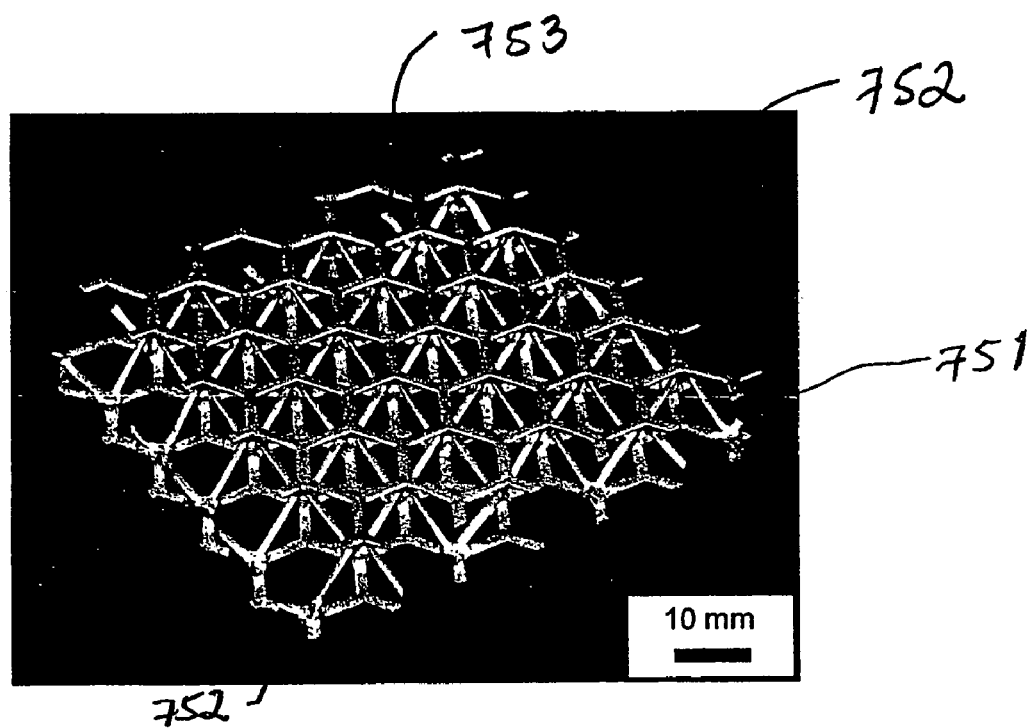

FIG. 24 is photographic depiction of a tetrahedral truss core 751 with facesheets 752 containing hexagonal holes 753.

DETAILED DESCRIPTION OF THE INVENTION

In its broadest aspect, the present invention provides constructed cellular solids structures—and method of manufacturing the same—for multifunctional applications (e.g., mechanical impact/blast absorption, thermal management capacity, noise attenuation, catalytic activity, filtration efficiency, electrical energy storage, retardation of chemical reactions and/or fire or act as a host for the in-growth of biological tissue, etc.) in addition to load support. An example of electrical energy storage technology is provided in co-assigned PCT International Application No. PCT/US01/25158, entitled "Multifunctional Battery and Method of Making the Same," filed Aug. 10, 2001, of which is hereby incorporated by reference herein in its entirety. An example of thermal management technology is provided in co-assigned PCT International Application No. PCT/US01/22266, entitled "Heat Exchange Foam," filed Jul. 16, 2001, of which is hereby incorporated by reference herein in its entirety.

The performance of the present invention cellular solid as a thermal management system, a catalyst support, a current collector, a noise damping system, a fire retarding structure. etc. depends on the topology of the porosity. For example, the present invention cellular solid may be interconnected (as intrusses) or closed (as in many foams or honeycomb in the form of sandwich panels). The present invention provides porosity in the form of open, closed and combinations of these mixed together, as well as intermixing multiple materials to create these structures. The invention provides optimally designed cellular solids with multifunctional possibilities.

As will be discussed in greater detail infra, but provided here as an overview, the present invention provides small elements of a chosen material that can be very uniformly arranged in controlled, three-dimensional space-filling arrays. The ligaments defining the cell walls do not necessarily have a constant cross section, nor need they be solid throughout or straight. When bonded together at points of contact, a cellular structure of highly repeatable cell geometry and few imperfections is the result. The bonds hold the elements together in a desired configuration and allow load to be efficiently transferred amongst them such that the structure is significantly more rigid when bent, compressed or sheared. The present invention space filling cellular structure provides simple, cost effective manufacturing methods applicable to a wide variety of materials. With the present invention, the truss-like or facesheet elements are made or formed from a wide variety of materials (e.g., metals, ceramics, glasses, polymers, composites and even semiconductors). The arranged elements are bonded together at points of contact by solid state, liquid phase, pressing or other methods. Various gluing processes also work. For example, liquid phase bonding of metals can be accomplished through transient liquid phase bonding, brazing and soldering while for polymers and ceramics, this could be achieved by cementing. If a liquid phase bonding agent is involved, it tends to get preferentially drawn by capillary action to points of element contact resulting in a fillet of large curvature radius. Transient liquid phase bonding is a preferred means of bonding metal truss core systems because the bonding agent diffuses into the ligaments and facesheets and creates a bond whose mechanical strength is comparable to that of the parent materials. Bonding via a braze results in bond strengths that can be significantly less than that of the parent material. Similar considerations apply to cements.

Figure 10A:
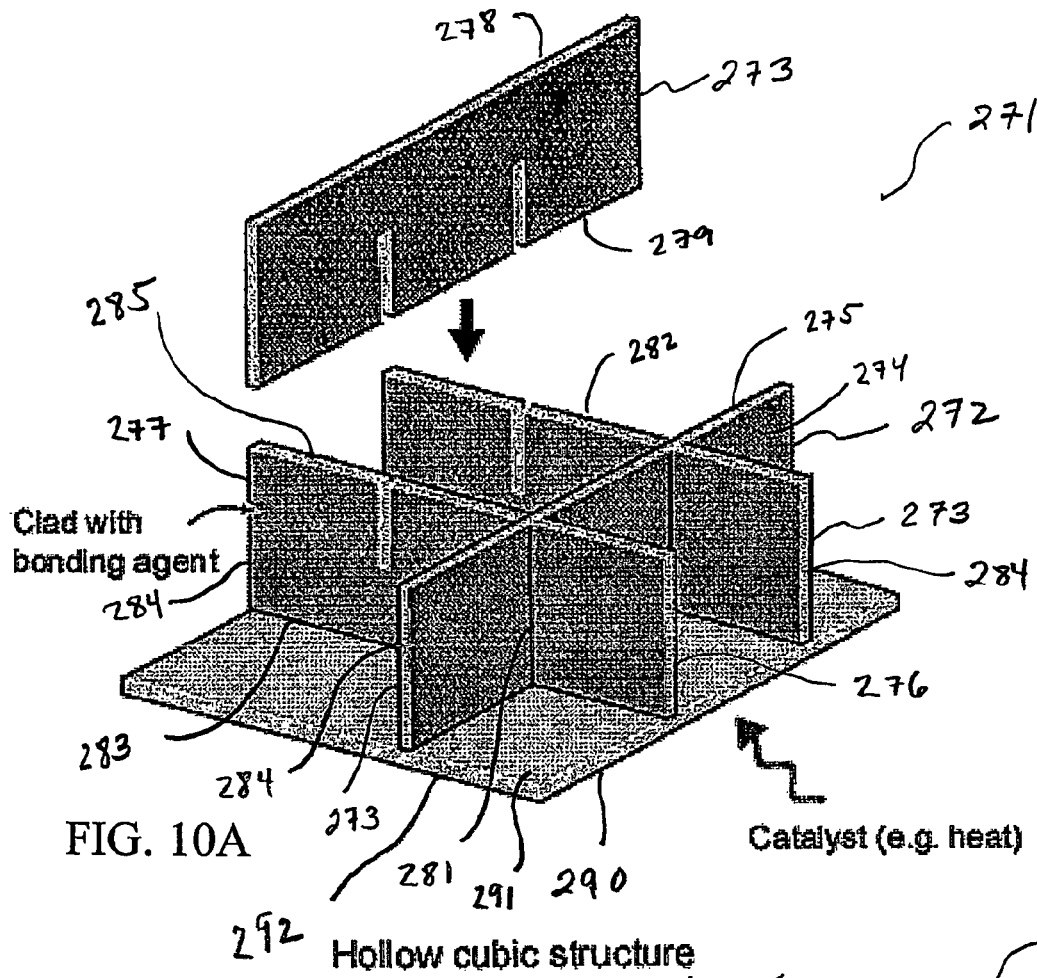
FIGS. 10(A)-10(B) show a schematic representation of a hollow cubic or rectangular shaped structure 271 in a partially constructed status and a fully constructed status, respectively.
Figure 10B:
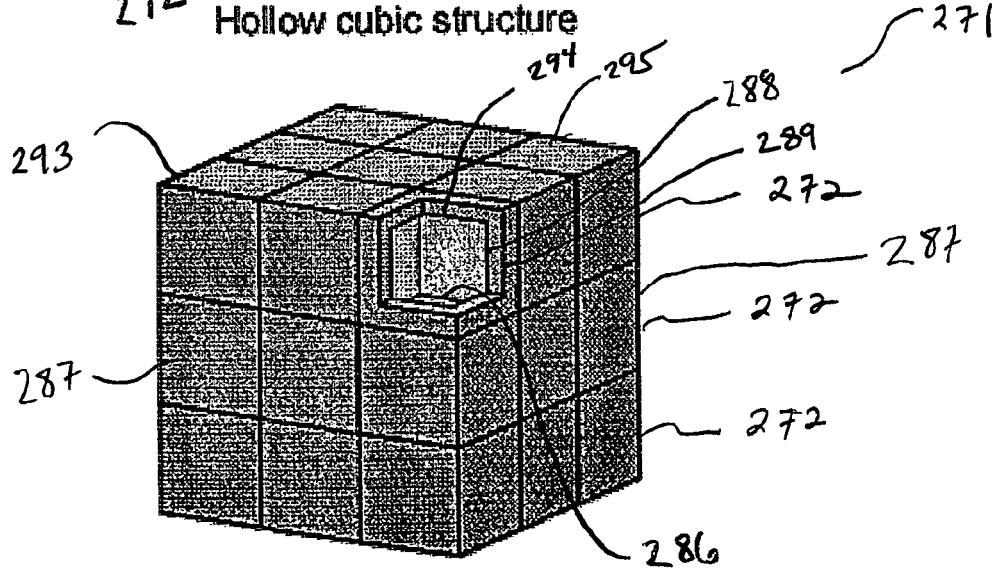

In a first aspect of the present invention, FIGS. 10(A)-10(B) show a schematic representation of a hollow cubic or rectangular shaped structure 271 in a partially constructed status and a fully constructed status, respectively. The hollow cubic structure 271 is a plate or strip structure comprising one or more vertically stacked three-dimensional space filling layers 272. Each of the three-dimensional space filing layers 272 comprise an array of elongated plates or strips 273 that are substantially planar. The plates/strips may be curved or bend as well. The elongated plates or strips 273 including a first side 274 and second side 275, a first lateral edge 276 and a second lateral edge 277, and a first longitudinal edge 278 and a second longitudinal edge 279, and wherein some of the plates or strips have slotted apertures 280 or the like that at least partially extend across the sides in a lateral direction. The plates or strips 273 intersect with other respective plates or strips 273, wherein said slotted apertures at least partially allow the intersecting plates or strips 273 to intersect there through so as to define an intersection segment 281. At least some of the intersection segments 281 are discretely bonded. The discrete bonds are formed between said intersecting plates or strips 273. The bonds are formed by a bonding method selected from at least one of the following: transient liquid phase bonding, solid-state diffusion bonding, brazing, soldering, chemical welding (e.g. solvents), pressing, welding, gluing, cementing or other means, or any combination thereof. FIG. 10(B) illustrates a cut away view on one of its cells or pors.

Continuing with FIGS. 10(A)-10(B), the three-dimensional space filling layers 272 include a top side 282 and a bottom side 283 and a perimeter with at least three perimeter sides 284. At least a portion of said top side 282 of each of said three-dimensional space filling layers 272 for the ($i^{th}$) through ($N^{th}$–1) layers comprise a top adjoining region 285. At least a portion of said bottom side of each of said three-dimensional space filling layers for the ($i^{th}$+1) through ($N^{th}$) layers comprise a bottom adjoining region 286. The three-dimensional space filling layers 272 are discretely bonded to immediate vertically adjacent to the three-dimensional space filling layers 272, wherein the discrete bonds are formed between the top adjoining region 285 and bottom adjoining region 286. The bonds are formed by a bonding method selected from at least one of the following methods: transient liquid phase bonding, solid-state diffusion bonding, brazing, soldering, chemical welding (e.g. solvents), pressing, welding, gluing, cementing or other means.

Still referring to FIGS. 10(A)-10(B), the structure 271 comprises one or more perimeter-oriented face sheets 287 having an inner surface 288 and an outer surface 289, wherein said inner surface 288 is fixedly bonded to one of said perimeter sides 284 of at least a minority of each of the three-dimensional space filling layers 272.

Still yet, the structure 271 comprises a layer-oriented face sheet 290 having an inner surface 291 and an outer surface 292, wherein the inner surface is fixedly bonded to at least a portion of the bottom side of first three-dimensional space filling layer 272.

Moreover, the structure 271 comprises a second layer-oriented face sheet 293 having an inner surface 294 and an outer surface 295, wherein said inner surface 294 is fixedly bonded to at least a portion of the top side of $N^{th}$ said three-dimensional space filling layer 272.

It should be appreciated that the cells may be formed by a variety of shapes besides a square as depicted in FIGS. 10(A)-10(B), such as quadrilateral, parallelogram, rectangular, triangular, hexagonal, octagonal, and other desired shapes.

Also, it should be noted that will the three-dimensional space filling layers 272 and sheets appear substantially planar, they may be formed or provided as curved or bent shape.

Moreover, the three-dimensional space filling layers 272 may be rotated at different orientations relative to other respective three-dimensional space filling layers 272. Also the materials of the three-dimensional space filling layers 272 may be comprise of different materials or a combination of different materials relative to other three-dimensional space filling layers 272.

Still yet, some of the three-dimensional space filling layers 272 or perimeter-oriented face sheet or layer-oriented face sheets may comprise of solid materials or porous materials so as to provide a structure 271 that is open, closed, or partially opened or closed.

Finally, additional face plates may be interspersed between the various space filling layers 272.

In one embodiment the method of making the structure 271 involves cladding rectilinear sheets with a bonding agent, slitting them in desired locations and then arranging within solid sheets to construct a cubic closed cell structure. With the help of a catalyst (e.g. heat), the bonding agent joins the elements at their points of contact such that the final structure is rigid and impenetrable to fluids.

In a second aspect of the present invention, FIGS. 11(A) and 12(A) are schematic representations of a second aspect of the present invention wherein prior to shaping there is shown a sheet 401 containing hexagonal perforations 402 and a sheet 403 containing square perforations 404, respectively. Note the dotted lines are not necessarily perforations, rather these lines may indicate where the bending occurs, if the sheets do not have existing perforated lines. The sheets may be solid or porous or mixed (open and closed). The cell shapes can be varied using an appropriately shaped tool. Rolling corrugation and stamping approaches work. When bonded to facesheets, controlled fractions of open and closed cells can be achieved.

FIGS. 11(B) and 12(B) are schematic representations of truss structures 405, 406, formed from the hexagonal designated 401 and square designated sheets 403, respectively. The truss structures 405, 406 include N number (N≧1) of vertically stacked three-dimensional space filling layers 407 (here two layers are vertically aligned in an exploded position), wherein each of the three-dimensional space filling layers 407 comprise an array of out-of-plane truss units 408. The truss units 408 comprising three leg members 409 for the tetrahedral shaped truss units of FIG. 11(B) and four leg members for the pyramidal truss units of FIG. 12(B). It can be observed from the figures that the leg members 409 are triangular-shaped and have generally planar surface. The leg members intersecting at an upper node 410, and distal from said upper node are lower nodes 411. The truss units connecting to nearest laterally adjacent truss units at lower nodes 411 and the upper nodes 410 are vertically aligned with respective lower nodes of corresponding immediate adjacent (in vertical direction) three-dimensional space filling layers 407. The three-dimensional space filling layers having a top side 412 and a bottom side 413. The three-dimensional space filling layers also have a perimeter with at least three perimeter sides 414. At least a portion of the top side of each of the three-dimensional space filling layers for the ($i^{th}$) through ($N^{th}$−1) layers comprise a top adjoining region 415. At least a portion of said bottom side of each of said three-dimensional space filling layers for the ($i^{th}$+1) through ($N^{th}$) layers comprise a bottom adjoining region 416. Each of the three-dimensional space filling layers are discretely bonded to immediate vertically adjacent said three-dimensional space filling layers. The discrete bonds are formed between the top adjoining region and bottom adjoining region. The bonds are formed by at least one of the following bonding methods: transient liquid phase bonding, solid-state diffusion bonding, brazing, soldering, chemical welding (e.g. solvents), pressing, welding, gluing, cementing or other means, or a combination thereof.

FIGS. 13(A) and 14(A) are schematic representations of a third aspect of the present invention, wherein prior to shaping there is shown a sheet 501 containing hexagonal apertures 502 and a sheet 503 containing square apertures 504. The cell shapes can be varied using an appropriately shaped tool.

FIGS. 13(B) and 14(B) are schematic representations of truss structures 505, 506, formed from the hexagonal perforated 501 and square perforated sheets 503, respectively. The truss structures 505, 506 include N number (N≧1) of vertically stacked three-dimensional space filling layers 507 (here two layers are vertically aligned in an exploded position), wherein each of the three-dimensional space filling layers 507 comprise an array of out-of-plane truss units 508. The truss units 508 comprising three leg members 509 for the tetrahedral shaped truss units of FIG. 13(B) and four leg members for the pyramidal truss units of FIG. 14(B). Here it is shown that the leg members 509 are more narrow than the legs shown in FIG. 11 or 12, supra. The leg members intersecting at an upper node 510, and distal from said upper node are lower nodes 511. The truss units connecting to nearest laterally adjacent truss units at lower nodes 511 and the upper nodes 510 are vertically aligned with respective lower nodes of corresponding immediate adjacent three-dimensional space filling layers 507. The three-dimensional space filling layers having a top side 512 and a bottom side 513. The three-dimensional space filling layers also have a perimeter with at least three perimeter sides 514. At least a portion of the top side of each of the three-dimensional space filling layers for the ($i^{th}$) through ($N^{th}$−1) layers comprise a top adjoining region 515. At least a portion of the bottom side of each of said three-dimensional space filling layers for the ($i^{th}$+1) through ($N^{th}$) layers comprise a bottom adjoining region 516. Each of the three-dimensional space filling layers are discretely bonded to immediate vertically adjacent said three-dimensional space filling layers. The discrete bonds are formed between the top adjoining region and bottom adjoining region. The bonds are formed by at least one of the following bonding methods: transient liquid phase bonding, solid-state diffusion bonding, brazing, soldering, chemical welding (e.g. solvents), pressing, welding, gluing, cementing or other means.

In other embodiments, hexagonal netting can also be shaped in such a way to create a very inexpensive tetragonal truss. Square weaves and expanded sheets (e.g. expanded metals) may also be utilized as well as sheets containing circular apertures and perforations or any appropriate aperture sheet or perforated sheet whose nodes align with those of the truss.

The open porosity makes them particularly well suited for multifunctional applications. Planar objects can be interspersed amongst the trusses to create complex cellular topologies whose multifunctional performance varies from place to place within the structure. The shape of the perforation (e.g., here either hexagonal or square-like) determines the ligament shape and number of ligaments per node while the deformation strain establishes the angle between ligaments. These govern mechanical and multifunctional performance. The ligament or leg member cross section is an important choice and various cross-sectional shapes can be made including circular, square, triangular, I-beam, H-beam and hollow forms.

Figure 15A:
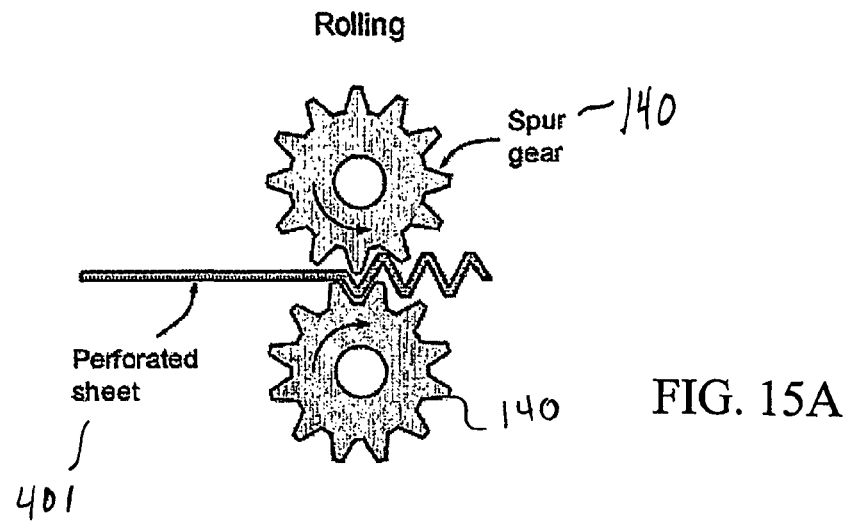
FIGS. 15(A) and 15(B) are schematic representations of a rolling system and a stamping system, respectively.
Figure 15B:
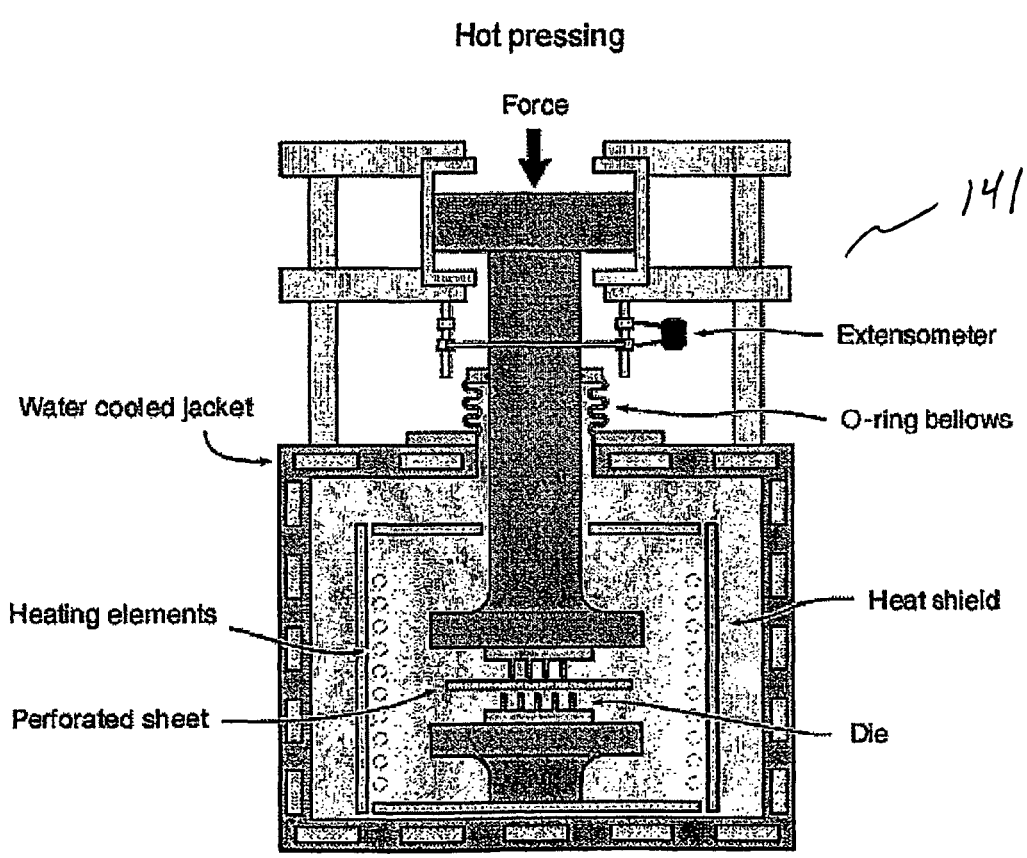

As schematically shown in FIG. 15(A), to deform an aperture sheet 501 or perforated sheet 401, a rolling process can be used including rolling gears 140. As shown in FIG. 15(B), another way involves a stamping process (here hot pressing is shown but the method can be alternative pressing as well) using a hot press system 141.

Once the cores have been made, open, closed and mixed porosity cellular solids are readily constructed through lamination or bonding. Either dense or porous facesheets can be used. As schematically shown in FIG. 16(A), a layer-oriented solid face sheet 701 having an inner surface 702 and an outer surface 703 can be bonded to the three-dimensional space layer 710 (i.e. core). On the bottom, the inner surface is fixedly bonded to at least a portion of the bottom side of first three-dimensional space filling layer 710. On the top, the inner surface is fixedly bonded to at least a portion of the top side of the last or $N^{th}$ three dimensional space filling layer 710. Of course it should be appreciated that the face plates may be interspersed between any of the plurality three-dimensional array layers. Here, just single truss layer is shown but multiple combinations of truss/facesheet layers (hierarchical cellular solids) can also be fabricated.

Moreover, there is shown perimeter-oriented face sheets 704 that is bonded to the three-dimensional space layer 710 (i.e., core) having its inner surface 705 that may be fixedly bonded to one of said perimeter sides of at least a minority of each of said three-dimensional space filling layers 710 (or bonded directly to at least a portion of layer-oriented solid face sheet 701).

Turning to FIG. 16(B), there is shown a layer-oriented solid face sheet 706 that is bonded to the three-dimensional space layer 710 (i.e. core) wherein the face sheet 706 is a sheet having triangular shaped apertures therein.

It shall be appreciated that any of the face plates or sheets may be any of the following: a solid sheet, a porous sheet, a sheet containing circular apertures, a sheet containing triangular apertures, a sheet containing hexagonal apertures, a sheet containing square apertures, a sheet containing triangular perforations, a sheet containing hexagonal perforations, a sheet containing square perforations or any appropriately aperture/perforated sheet whose nodes align with those of the truss.

As schematically shown in FIG. 17(A) and (B), another way to construct cellular solids involves selective bonding of a solid or porous sheet within solid or porous sheets followed by internal expansion. This could occur within the confines of a tool to produce near net shape parts. FIG. 17(A) illustrate the sheets 715, 716, 717 having spot bonds 718 prior to expansion. FIG. 17(B) illustrate the structure 719 after sheet has been expanded and bonded to the face sheets 715, 717.

Figure 18D:
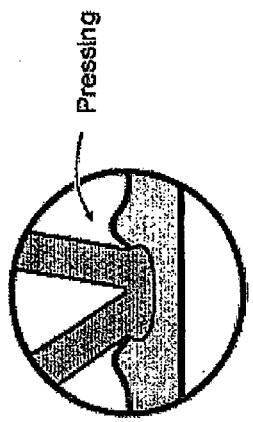
Figure 18E:
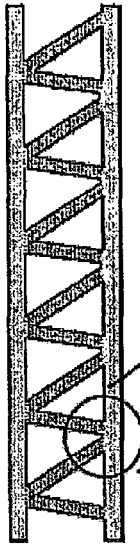
Figure 18F:
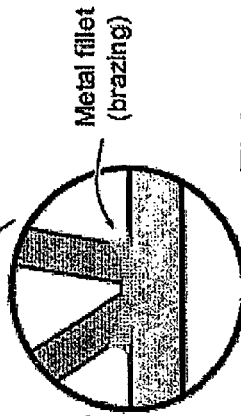
Figure 18A:
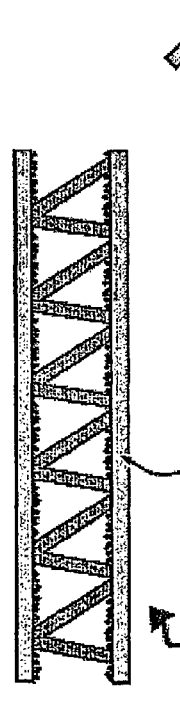
Figure 18B:
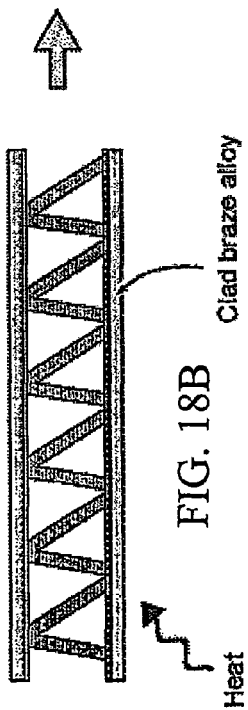
Figure 18C:
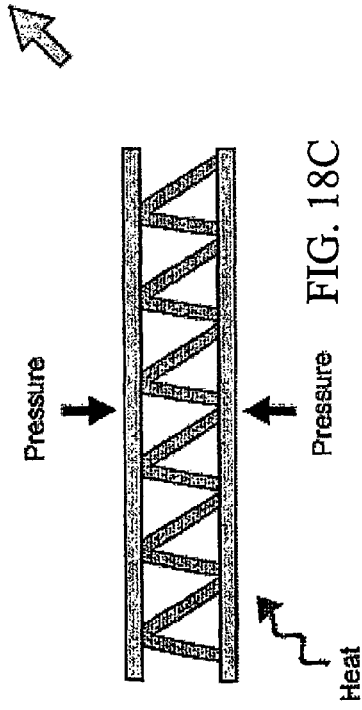

As schematically shown in FIGS. 18(A)-(F), various methods of bonding of metal trusses to solid or porous facesheets can be achieved using solid state (e.g. diffusion bonding), liquid phase method, braze alloy powder method (FIG. 18(A)), clad braze allow method (FIG. 18(B)), or pressing methods (FIG. 18(C)) to create a bonded metal panel (FIG. 18(D)). Also schematically shown is the press bond (FIG. 18)) and the metal fillet bond (FIG. 18(F)). The out of plane deformation can pre or post-cede the bonding step. If a wetting liquid phase is used, it gets drawn by capillary action to contact points and solidifies to form a mechanically desirable fillet of large curvature radius.

FIGS. 22(A)-(C) show exemplary truss units 731, 732, 733 that are tetrahedral, pyramidal, and kagome shaped, respectively. It is contemplated that unit cells with members having a variety of tubular cross-section geometries can be used including hollow circles, rectangles, squares, hexagons, triangles, ellipses, hexagons, etc. Non-tubular section geometries include circles, rectangles, squares, hexagons, triangles, ellipses, hexagons, etc. Semi-tubular section geometries include I-beams, Z-sections, C-sections, etc.

It is further noted that sandwich structures can be made by bonding the truss cores within facesheets (that are not necessarily solid). For example, they could have porosity within them or contain holes of circular, square, rectangular, hexagonal, triangular, ellipsoidal or other shape. The bar intersections within sheets having holes of appropriate shape, size and spacing can be made to align with the truss core nodes creating truss networks. For pyramidal cores, square perforations are effective. For tetrahedral and Kagome cores, triangular or hexagonal holes are suitable. Like the core members, these bars could be hollow too. Multiple stacking of sandwich layers create hierarchical structures.

As schematically shown in the side view of FIG. 23(A), any of the truss structures, three-dimensional arrays, truss units, or sandwich structures 741 may be curved (including a variety of curve shapes and combinations thereof) rather than planar. Similarly, as schematically shown in the perspective view of FIG. 23(B) any of the hollow cubic or rectangular structures 742 may be curved (including a variety of curved shapes and combinations thereof) rather than planar.

As shown in the photographic depiction of FIG. 24, a tetrahedral truss core 751 with facesheets 752 containing hexagonal holes 753 is provided. A Kagome truss core also can be used with hexagonal facesheets. The core and facesheet materials can have a wide variety of cross-section shapes including hollow forms.

EXAMPLES

Practice of the invention will be still more fully understood from the following examples, which are present herein for illustration only and should not be construed as limiting the invention in anyway.

Example

Truss and Core Sandwich Panel

Figure 19B:
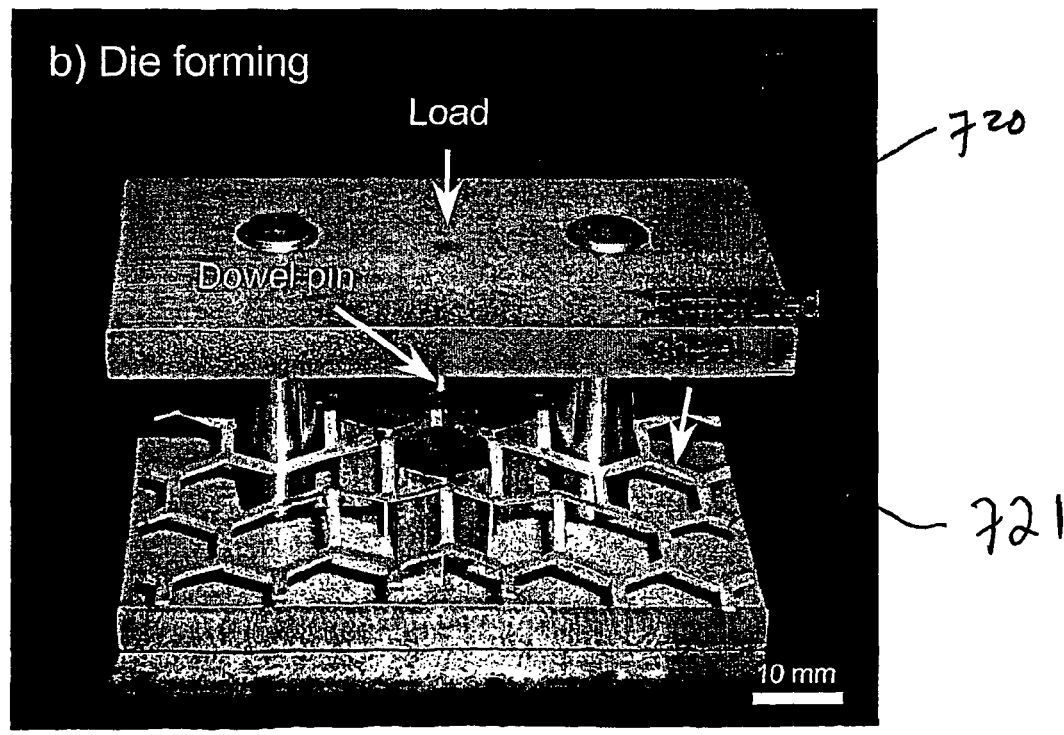
Figure 20A:
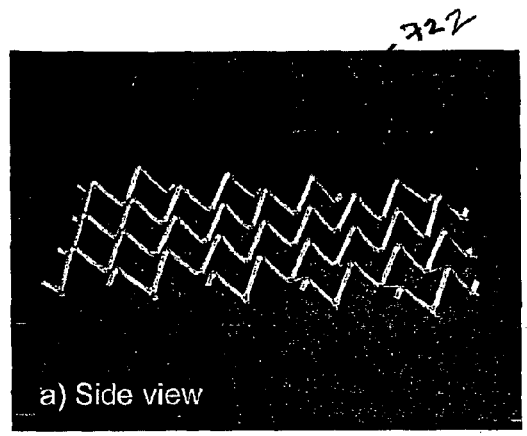
Figure 20B:
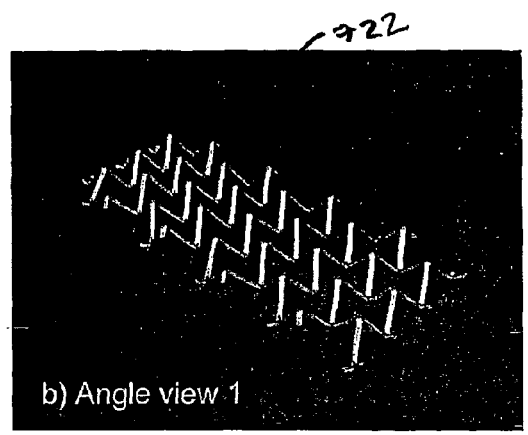
Figure 20C:
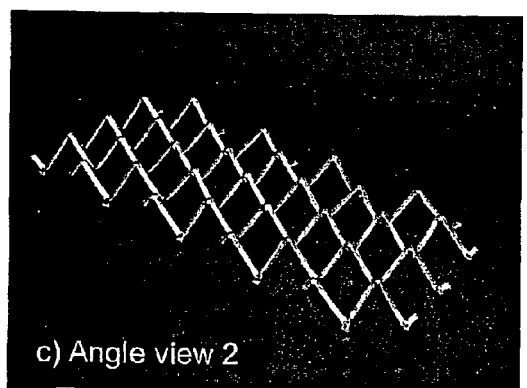
Figure 20D:
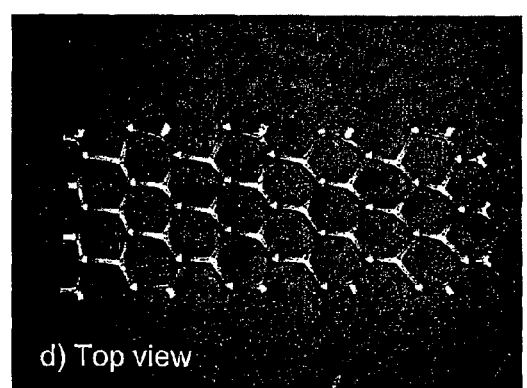

FIGS. 19(A) and 19(B) shows the apparatus 720 for an exemplary process to be used to fabricate sheets 720 of miniature wrought metal trusses from a perforated metal sheet (hexagonal perforations). The hexagonal perforated 304 stainless steel sheet was obtained (Woven Metal Products, Alvin, Tex.). It was 0.028" thick and contained $7/16$" hexagonal perforations of $1/2$" staggered centers spacing. The open area percentage was approximately 81%. The perforated sheet was first annealed in vacuum at 1100° C. and then stretched at its intersections using dowel pins within a die of the apparatus 720.

FIGS. 20(A)-(D) are photographic depictions of the resultant three dimensional layer 722, showing the side view, first perspective view, second perspective view, respectively. An intermediate annealing treatment was used midway through the stretching to soften the structure and reduce cracking at the dowel pin contact points. Some methods may exclude the annealing steps. As the core of a sandwich panel or when laminated to create a hierarchical cellular solid, mechanical properties would compete with those of the best commercially available structures but at reduced cost.

Next, as shown in the photographic depiction of FIG. 21, this miniature tetragonal truss 722 having individual tetrahedral truss units 724 was then bonded to 304 stainless steel facesheets 723 (0.025 in thick) using a transient liquid phase method. To succeed, one side of each facesheet 723 was first coated with a mixture of Nicrobraz® Cement 520 (Wall Colmonoy Corp., Madison Heights, Mich.) and fine (−140 mesh) Nicrobraz® 51 braze alloy powder (Wall Colmonoy Corp., Madison Heights, Mich.) of composition; Ni-25Cr-10P. The facesheet-core assembly was then assembled and slowly heated under weak vacuum to 550° C. to completely volatilize the cement. After volatilization, the braze alloy powders remained adhered to the facesheets. After the vacuum had achieved a level less than $10^{-4}$ torr, the temperature was ramped at a rate of 10° C./min to 1120° C. and held there for 1 hr followed by a furnace cool. During heating, the braze alloy powder melted and easily flowed to be preferentially drawn by capillary action to points of facesheet-core contact. This procedure, along with variations of sequence and combinations, results in strong, but ductile joints of large curvature radius, as demonstrated, for example, by the metal fillets 725.

Example

Core Design

Cellular geodesic domes [5] are amongst the most structurally efficient cellular structures. Their favorable strength-to-weight geometry was extended to rectangular prismatic forms by way of the octahedral-tetrahedral truss [6]. These stiff, strong designs are based upon a triangulated architecture wherein truss members are elastically loaded in tension or compression only with no bending. Under this mode of deformation, the stiffness and strength have a linear dependence upon density making them a favored cellular topology for open cell structures intended for lightweight load support applications. Several studies have investigated the manufacture and performance of miniaturized versions of similar tetrahedral truss based structures as the cores of all metal sandwich panels [13-15]. They were made with legs of circular cross-section by investment casting.

Figure 1:
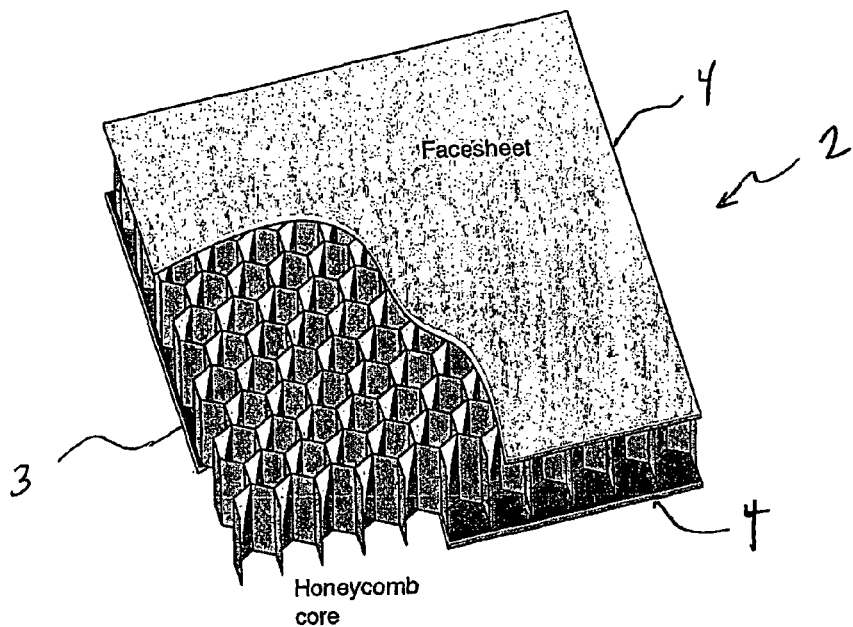
FIG. 1 is a schematic perspective view of a honeycomb core sandwich structure.
Figure 2:
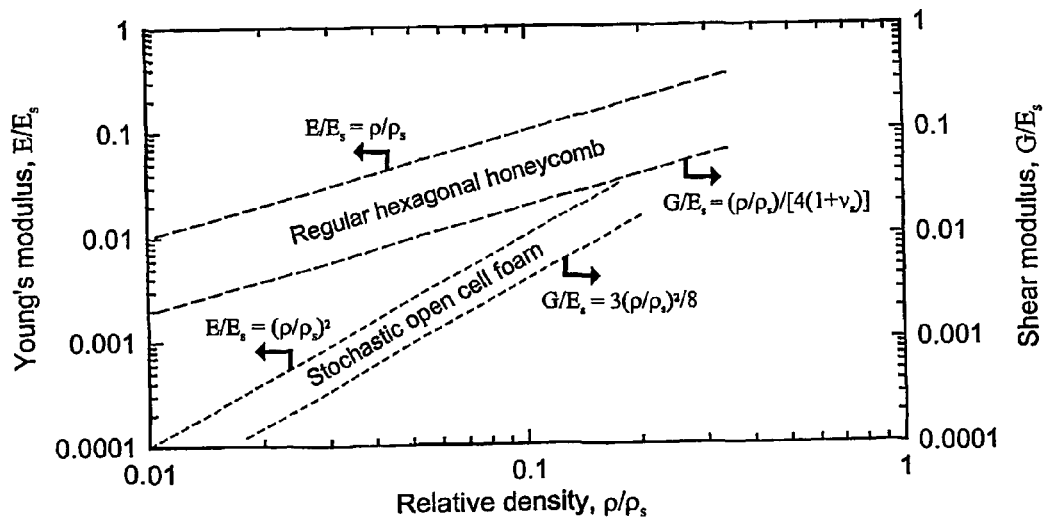
FIG. 2 is a graphical representation that summarizes the Young's and shear moduli relative density relationships for various cellular concepts.
Figure 3:
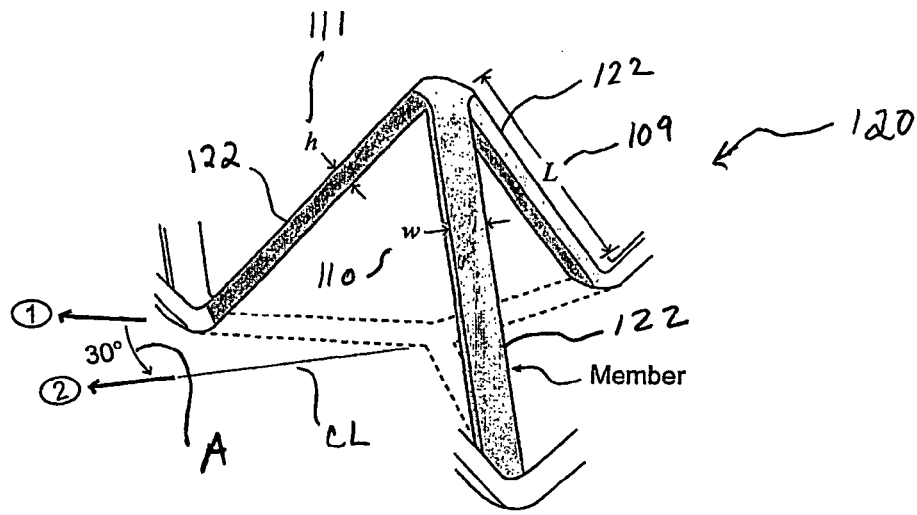
FIG. 3 shows a schematic representation of triad or truss unit 120 of the present invention.

Referring to FIG. 3, there is provided a schematic representation of the present invention design of a tetrahedral truss core made up of triad units or prongs 120 with leg members 122 of length 109, as referenced as L, and rectangular cross-section dimensions having a width 110, as referenced as w, and height 111, as referenced as h. The angle, as referenced as A, of each leg member makes with a line, referenced as CL, extending from the center of the triad or prong base to its peak is a $\cos(\sqrt{2/3})$, the triad or prong 120 height is about $L\sqrt{2/3}$ and it provides support over a planar area $\sqrt{3}L^2/2$. The relative density of the core is close to $$\frac{\rho_c}{\rho_s} = \frac{3\sqrt{2}\,wh}{L^2} \quad (1)$$

where $\rho_c$ is the density of the core and $\rho_s$ is the density of its base material. To simplify, the base material will be treated as elastic-perfectly plastic. Point loading of a single tetrahedral triad unit can be used to establish core mechanical performance. The elastic behavior of a pin-connected tetrahedral truss core is isotropic with relative moduli given by [14]

$$\frac{E_c}{E_s} = \frac{4}{9}\left(\frac{\rho_c}{\rho_s}\right) \quad (2)$$

$$\frac{G_c}{E_s} = \frac{1}{9}\left(\frac{\rho_c}{\rho_s}\right) \quad (3)$$

where $E_c$ and $G_c$ are the Young's and shear moduli for the core while $E_s$ is the Young's modulus of its base material. The relative yield strengths are [14]

$$\frac{\sigma_{cy}}{\sigma_{ys}} = \frac{2}{3}\left(\frac{\rho_c}{\rho_s}\right) \quad (4)$$

$$\frac{1}{3\sqrt{2}}\left(\frac{\rho_c}{\rho_s}\right) \le \frac{\tau_{cy}}{\sigma_{ys}} \le \frac{\sqrt{6}}{9}\left(\frac{\rho_c}{\rho_s}\right) \quad (5)$$

where $\sigma_{cy}$ and $\tau_{cy}$ are the compressive and shear yield strengths for the core while $\sigma_{ys}$ is the yield strength of its base material. Here, the minimum shear strength occurs when shearing is parallel to the projection of one set of members onto the base-plane (1-direction). The maximum occurs when shearing is oriented 30 to this projection (2-direction).

For structural applications, a yielding mode of failure is preferred to the elastic buckling mode. For the lightest truss core, the inventors seek the thinnest possible members that yield before they elastically buckle. These member dimensions lead to nearly simultaneous elastic buckling and yielding of members within. Elastic buckling of a single pin-connected member of solid rectangular section occurs at a member stress [16]

$$\sigma_b \le \frac{-\pi^2 E_s h^2}{12 L^2} \quad (6)$$

where $h \le w$ and the negative sign indicates compression. Equating member buckling stress to compressive yield strength, $-\sigma_{ys}$, the member cross-section dimension for the lightest (pin-connected) truss core is given by $$h_{min} = \frac{L}{\pi}\left(\frac{12\sigma_{ys}}{E_s}\right)^{1/2} \quad (7)$$

Since elastic or plastic buckling occur about the thinnest cross-section dimension, square (circular or other equiaxed) sections are preferable to rectangular sections. Provided $h > h_{min}$, failure initiates by yielding. The corresponding minimum relative density for the tetrahedral truss core (with square cross-section members) is then $$\left(\frac{\rho_c}{\rho_s}\right)_{min} = \frac{36\sqrt{2}\,\sigma_{ys}}{\pi^2 E_s}. \quad (8)$$

where the ratio $\sigma_{ys}/E_s$ is the material dependent yield strain. It is noted that the lightest truss cores are made from low yield strain alloys.

Figure 4:
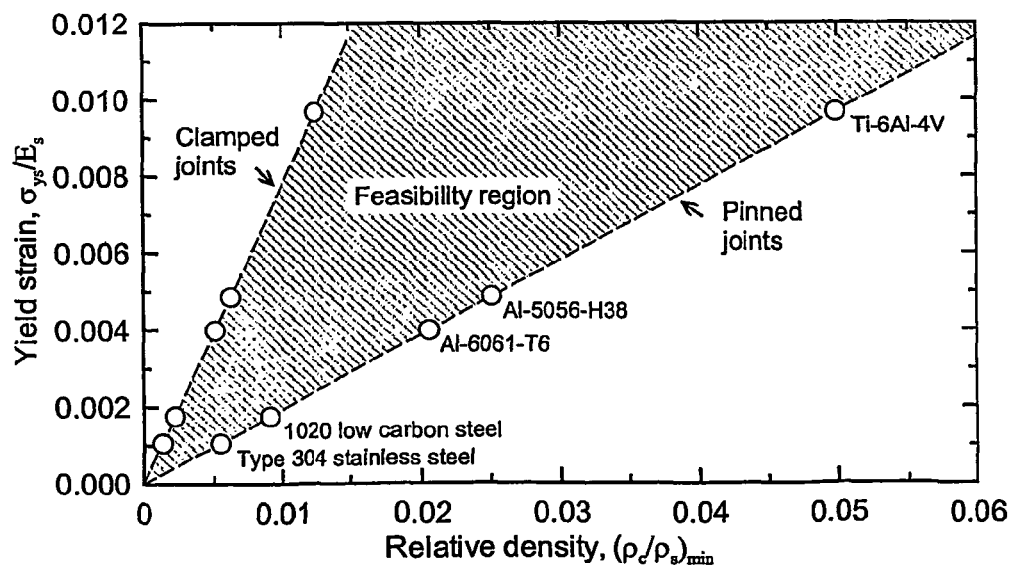
FIG. 4 is a graphical representation of the material dependent relative density relationships for minimum mass tetrahedral truss cores.

Here, a pin-connected (conservative) approach to the buckling analysis has been used. For clamped members, the minimum cross-section dimension is divided by two and the core relative density by four. In practice, the joint normally behaves in a fashion intermediate to the pinned (no moment) and clamped (finite moment) conditions. In FIG. 4, there is plotted minimum mass core relative density ranges for several common engineering alloys whose representative properties are given in Table 1 [17]. FIG. 4 graphically indicates that the preferred relative density range is material specific. Tetrahedral truss cores with relative densities in the 0.1-0.5% range are optimal for type 304 stainless steel but cores with relative densities in the 1-5% range are optimal for Ti-6Al-4V.

TABLE 1

| Wrought alloy | Density (g/cm³) | Young's modulus (GPa) | Yield strength (MPa) | Yield strain |
|---|---|---|---|---|
| Al-6061-T6 | 2.7 | 69 | 275 | 0.0040 |
| Al-5056-H38 | 2.7 | 71 | 345 | 0.0049 |
| Ti-6Al-4V (solution + aging) | 4.5 | 114 | 1103 | 0.0097 |
| 1020 low carbon steel (normalized) | 7.9 | 196 | 345 | 0.0018 |
| Type 304 stainless steel (annealed) | 8.0 | 193 | 205 | 0.0011 |

Example

Sandwich Construction

The present invention provides a variety of approaches used to create miniature trusses with characteristics similar to those described herein. Bending at the nodes of suitably perforated metal sheets provides one approach. Simple punching at alternate nodes provides another. Bending and punching operations can be combined by using appropriately shaped dies and CNC machines. The processes can be performed either under ambient or hot temperature conditions. In the latter, superplastic conditions can be utilized.

To illustrate the fabrication of miniature, wrought metal tetrahedral truss cores, hexagonal perforated type 304 stainless steel (Fe-18Cr-8Ni) sheet was obtained from Woven Metal Products, Inc. (Alvin, Tex.). The sheet was 0.74 mm thick and it contained 11.1 mm hexagonal holes (face distance) of 12.7 mm staggered centers spacing. The bar widths were 1.6 mm and the open area fraction was 77%. With L=12.7 mm, we estimate a triad height of 10.4 mm upon deforming the sheet out-of-plane to create tetrahedral trusses.

Figure 5:
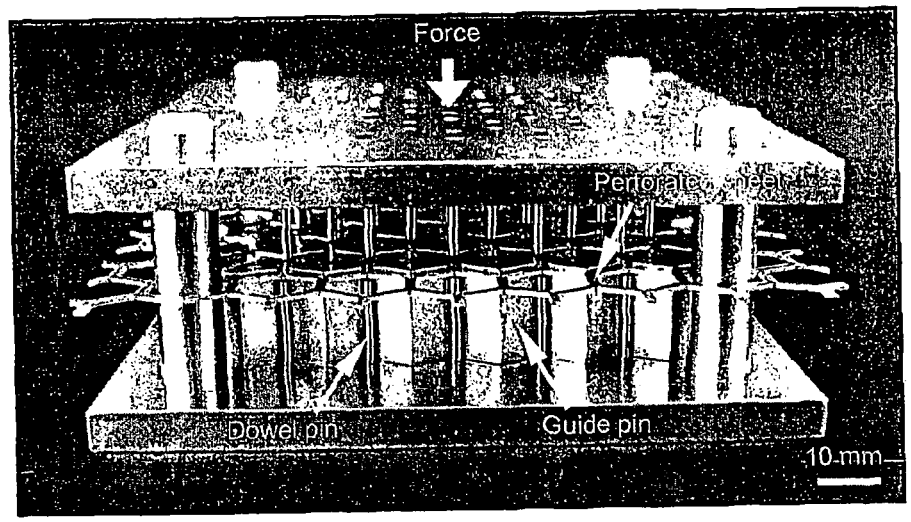
FIG. 5 illustrates a press apparatus used for deforming the shape of truss cores.
Figure 6:
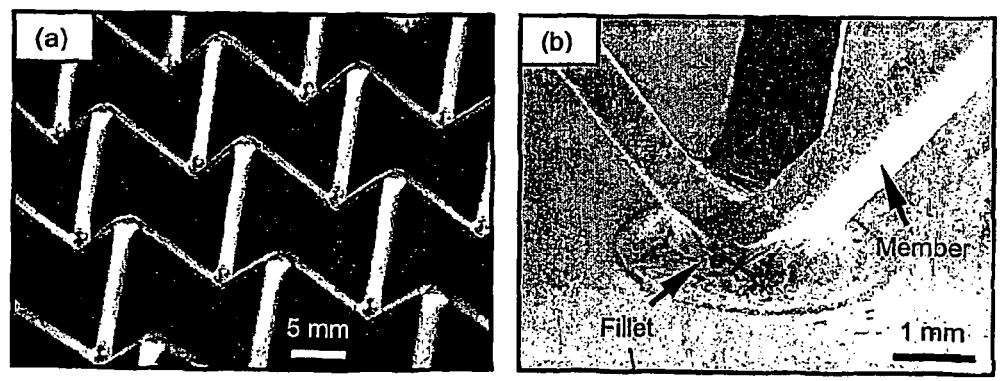
FIG. 6(A) photographically depicts the tetrahedral truss core after shaping.
FIG. 6(B) photographically depicts enlarged view of the a preferred core/facesheet bond.

FIG. 5 illustrates a press apparatus used for deforming the shape of truss cores. Within the jig, bars were stretched by pushing (screw driven testing instrument at 5 mm/min) at their intersections (nodes) using hardened steel dowel pins of 1.6 mm diameter. Two intermediate annealing treatments (1100° C. for 15 min) were needed to soften the strain-hardened bars and prevent dowel pin punch through at the nodes. The final core heights were 10.0 mm (measured) and their relative densities were about 1.7% (before sandwich construction). After shaping, truss members had w=1.26 mm and h=0.59 mm, FIG. 6(A). Handbook values for annealed type 304 stainless steel will be used throughout, Table 1. From Eq. (7), we find $h_{min}$=0.46 mm and since $h_{min}$<h, core failure is designed to initiate by yielding. This core has about three-times more mass than the lightest core with members of square cross-section. It is noted that other structurally attractive truss designs having pyramidal [18], Kagomé [19] or other cellular architectures can be fabricated in a similar way.

A transient liquid phase approach was used for attaching thin facesheets to the cores. Truss cores were lightly sprayed with a mix of a polymer based cement (Nicrobraz® Cement 520) and −140 mesh (diameter≦106 mm) Ni-25Cr-10P braze alloy powder (Nicrobraz® 51) both supplied by Wal Colmonoy Corp. (Madison Heights, Mich.). The solidus and liquidus of this alloy are 880° C. and 950° C. whereas the solidus of type 304 stainless steel is approximately 1400° C. The coated cores were then placed between solid 0.75 mm thick type 304 stainless steel facesheets (the thickness, t, was chosen to promote failure by core shearing) and a small compressive pressure was applied. Perforated facesheets can also be used and when bonded to multiple core layers, multi-laminate and/or hierarchical structures are readily made.

Flexure panel cores were oriented for shearing to occur parallel to the projection of one set of members onto the facesheet (base-plane). The assemblies were then heated in a vacuum of better than $10^{-2}$ torr at 15° C./min to 550° C. for 1 hr to volatilize the polymer cement. An important feature of this cement/braze combination is that the braze alloy powders remain adhered after volatilization. The system was then evacuated to a vacuum level below $10^{-3}$ torr and the temperature was ramped at a rate of 15° C./min to 1100° C. and held there for 1 hr (for joint ductility enhancement).

At temperature, the braze alloy powders melted to coat the members (this seals microscopic defects) and the melt was drawn by capillary forces to points of core/facesheet contact. Interdiffusion then changed the contact composition and elevated its melting point causing solidification at the brazing temperature. Filleted joints of large curvature radius (to resist cracking) were obtained, as photographically shown in FIG. 6 (B).

After furnace cooling to ambient, sandwich structures were machined for testing. The flexure panel length was 247 mm, its width was b=66.0 mm, its thickness was c+2t=11.3 mm and its mass was 219 g. The final core height was slightly reduced to c=9.8 mm owing to the compressive forces applied during heating. After sandwich construction, the measured relative density of the core, $\rho_c/\rho_s$=1.8%, was only slightly greater than before (1.7%).

Example

Beam-Flexure Analysis

Figure 7:
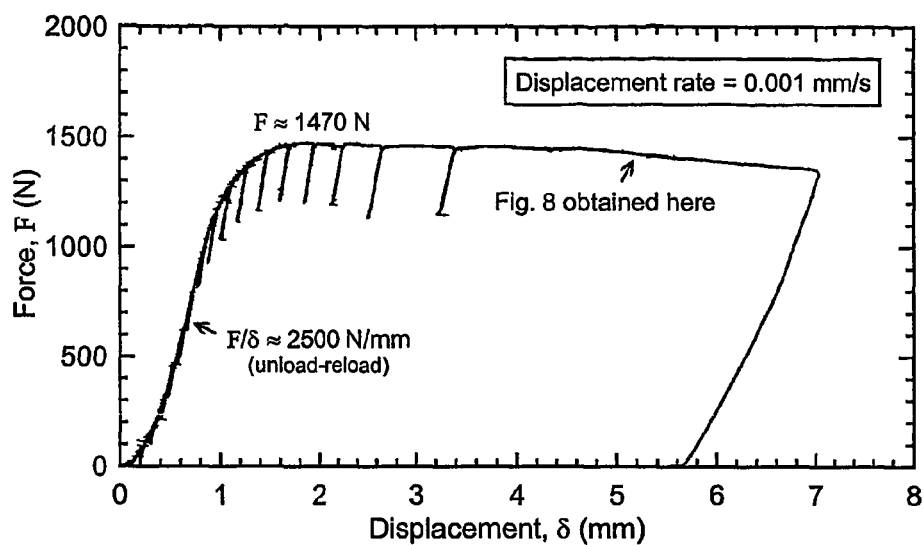
FIG. 7 is the graphical representation of the measured load-deflection data obtained during the beam-flexure test.

Specific details of the midspan loading procedure can be provided [15,20]. The measured load-deflection curve is shown in FIG. 7. A quasistatic unload-reload scheme was used to measure a beam stiffness, F/δ≈2500 N/mm, where F and δ are the midspan load and deflection. The deflection was expected to be about [1]

$$\delta = \frac{Fl^3}{24E_f bt(c+t)^2} + \frac{Fl}{4bcG_c} \quad (9)$$

where $E_f$ is Young's modulus for the thin facesheets. From Eq. (9), we obtain an estimate for the core shear modulus, $G_c$≈1.01 GPa, which corresponds to $G_c/E_s$≈0.0053.

Figure 8:
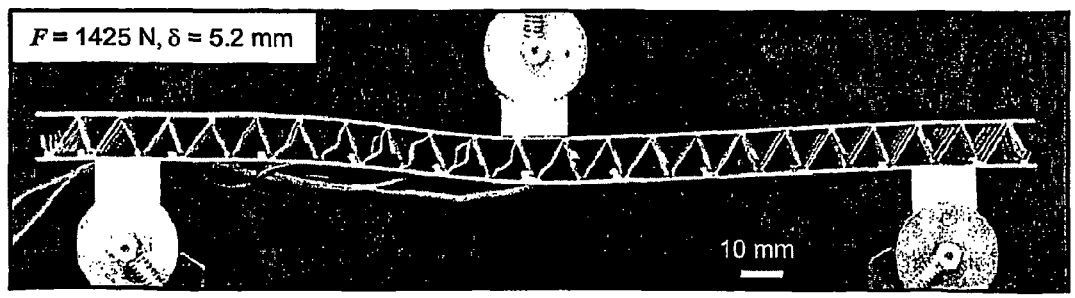
FIG. 8. demonstrates according to visual observations during the test, that span was l=202 mm and the flat steel indenters were 16.0 mm wide.

During beam failure, the set of truss members on the left side of the beam (with facesheet projection parallel to the shearing direction) first yielded in compression and then plastically buckled about their thinnest cross-sections, FIG. 8. A plastic hinge developed near the outer support on the left side. On the right side, members of this same set yielded in tension and work hardened. Neither plastic buckling or a hinge were observed there. Similar antisymmetric behavior has been seen in comparable investment cast systems [15]. As observed from FIGS. 7 and 8, considerable stiffness and load bearing capacity are retained after initial plastic buckling.

The collapse load for beams having a small overhang, H (distance from the center of an outer indenter to the beam edge), is [1]

$$F_A = \frac{2bt^2}{l}\sigma_{fy} + 2bc\tau_{cy}\left(1 + \frac{2H}{l}\right) \quad (10)$$

where $\sigma_{fy}$ is the facesheet yield strength. For large overhangs, plastic hinges form near the outer indenters and the collapse load becomes [1]

$$F_B = \frac{4bt^2}{l}\sigma_{fy} + 2bc\tau_{cy} \quad (11)$$

Since both failure modes were observed along the beam, we let $F_A$≈$F_B$≈1470 N and obtain estimates for the core yield strength, $\tau_{cy}$≈(0.88, 1.02) MPa, from Eqs. (10) and (11) where H=22.5 mm. The mean of these values gives $\tau_{cy}$≈0.95 MPa and the corresponding relative core shear strength is approximately $\tau_{cy}/\sigma_{cy}$≈0.0046. We note that after testing, all core/facesheet bonds appeared intact with no visually observed cracking.

Example

Honeycomb Versus Tetrahedral

Figure 9:
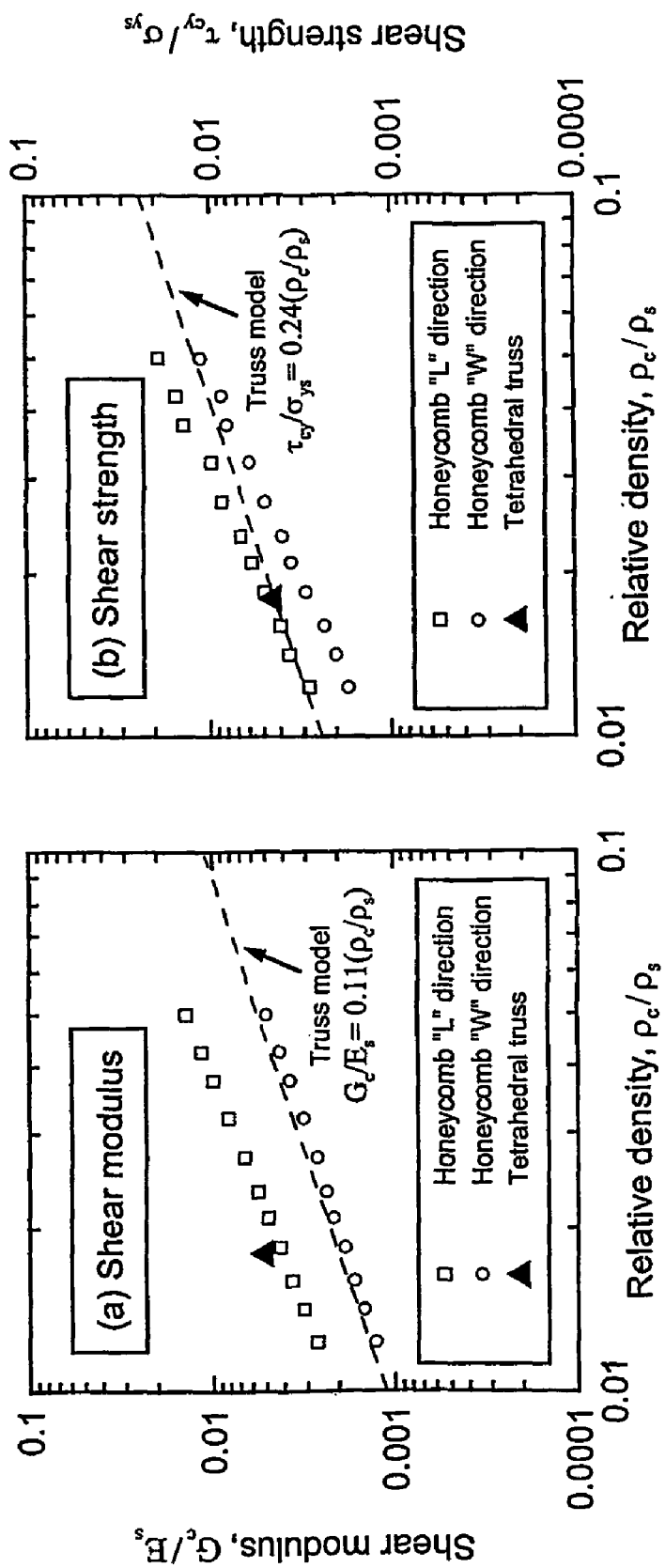
FIGS. 9(A)-(B) are graphical representations demonstrating relative property comparisons for honeycomb and tetrahedral truss core systems for shear modulus and shear strength, respectively.

As graphically shown in FIG. 9, Hexcel Composites (Pleasanton, Calif.) 5056-H39 aluminum honeycomb shear properties (plate shear test data) [2] are compared with measurements for the type 304 stainless steel tetrahedral truss core and model predictions, Eqs. (3) and (5). The honeycomb is normally made from rolled alloy 5056-H191 aluminum sheet ($E_s$=71 GPa, $\sigma_{ys}$=435 MPa and $\rho_s$=2.6 g/cm$^3$) onto which adhesive lines are drawn. This is followed by stacking, curing to form HOBE® (Honeycomb Before Expansion) block and then expansion into honeycomb [2]. There is a doubling of wall thickness in the "L" direction as opposed to the other "W" direction and the mechanical properties are affected. In FIG. 9, it can be seen that the measured and predicted relative shear modulus and strength of the tetrahedral truss core compare favorably with those of similar relative density honeycomb. Note however, that predictions for the truss core shear modulus are based upon pin-connected members. In practice, the added rotational resistance afforded by the nodes and braze alloy fillets could lead to stiffness enhancement. Plate shear test confirmation would be helpful since core shear values obtained from flexure tests are often higher than those obtained from plate shear tests [2]. Furthermore, inversion of Eq. (9) for the shear modulus is sensitive to measurement error propagation. Nonetheless, the relative properties of the tetrahedral truss core significantly exceed stochastic foam systems, are close to model predictions and show much promise as an open cell counterpart to honeycomb.

In summary, the present invention provides an improved structural/multifunctional material designs to form periodic cellular solids, and methods for their manufacture.

Another advantage of the present invention is that it provides constructed cellular solids structures—and method of manufacturing the same—for multifunctional applications (e.g. mechanical impact/blast absorption, thermal management capacity, noise attenuation, catalytic activity, filtration efficiency, electrical energy storage, retardation of chemical reactions and/or fire or act as a host for the in-growth of biological tissue, etc.) in addition to load support.

Moreover, another advantage is that the performance of the present invention cellular solid may include inter alia a thermal management system, a catalyst support, a current collector, a noise damping system, a fire retarding structure, etc., depending on the topology of the porosity. For example, the present invention cellular solid may be interconnected (as intrusses) or closed (as in many foams or honeycomb when it is in sandwich panels). The present invention provides porosity in the form of open, closed and combinations of these mixed together, as well as intermixing multiple materials to create these structures. The invention provides optimally designed cellular solids with multifunctional possibilities.

Further yet, an advantage of the present invention is that it may encompass a wide variety of materials wherein the fabricated truss core system materials include ceramics, glasses, polymers, composites and even semiconductors.

In addition, another advantage of the present invention is that it provides a method of bonding by transient liquid phase approaches including brazing. In general, the bonding through brazing, soldering, transient liquid phase bonding, solid-state diffusion bonding (i.e. materials are placed in contact and heated), chemical welding (e.g. acetone for plastics) pressing or other means are possible. Gluing and cementing are feasible as well. The bonding agents can be applied in a number of ways through cladding, powder spraying, liquid infiltration, etc.

A further advantage of the present invention is attributed to liquid phase bonding, wherein when liquid phase is used for bonding, it gets drawn by capillary forces to contact points and solidifies to form a mechanically desirable fillet of large curvature radius (resists cracking). This is an excellent way to join miniature engineering type structures and create strong durable bonds. All of the bonds take at once making it very efficient and economical.

Another advantage of the present invention is due to the fact that when the bonding agent is in the liquid state, it flows over the constructed materials in addition to bonding them. This seals microscopic defects created by the prior deformation steps and is an efficient coating method. The thin surface coating left behind by the TLP/Brazing method has a different composition and properties to the base metal. For example, low carbon steels and copper alloys can be made corrosion resistant by bonding and coating with high chromium containing TLP alloys.

Further yet, an advantage of the present invention is due to the feature that the truss-like elements do not necessarily have to have a constant cross-section, nor are they necessarily straight or solid throughout (they could be hollow). However, straight is a preferred embodiment. They can have circular, square, triangular, I-beam or other cross-section shapes of interest. These have higher moments and are therefore more structurally efficient.

Finally, an advantage of the present invention is that closed cell structures can be made by bonding arranged sheets. The three-dimensional space filling structures with rectangular and triangular pores are efficiently made in this way. These would have the highest per unit weight stiffness and strengths of any known closed cell structures. The hollow cube structure could be isotropic (i.e. mechanical properties are the same in all directions). Also, hexagonal netting can be shaped into trusses as well as expanded metals (both are inexpensive and worth pursuing even if properties are less than theoretical estimates). TLP/brazing of this material improves its performance. To make expanded material, slits are made into a metal sheet and the metal is pulled apart. Unlike perforated sheets or sheets with apertures, there is no waste of metal due to throwing away of the punched out hole material.

The invention may be embodied in other specific forms without departing from the spirit or essential characteristics thereof. Of course, it should be understood that a wide range of changes and modifications can be made to the preferred embodiment described above. The foregoing embodiments are therefore to be considered in all respects illustrative rather than limiting of the invention described herein. Scope of the invention is thus indicated by the appended claims as read in light of the foregoing description, including all equivalents, and all changes which come within the meaning and range of equivalency of the claims are therefore intended to be embraced herein.

REFERENCES

The references as cited throughout this document and below are hereby incorporated by reference in their entirety.

[1] M. F. Ashby, A. G. Evans, N. A. Fleck, L. J. Gibson, J. W. Hutchinson and H. N. G. Wadley, *Metal Foams: A Design Guide*, Butterworth-Heinemann, Boston 2000.
[2] HexWeb™ *Honeycomb Attributes and Properties*, Publication No. TSB 120, Hexcel Composites, Pleasanton 1999.
[3] *Honeycomb Sandwich Design Technology*, Publication No. AGU 075, Hexcel Composites, Duxford, Cambridge 1998.
[4] L. J. Gibson and M. F. Ashby, *Cellular Solids, Structure and Properties—Second Edition*, Cambridge University Press, Cambridge 1997.
[5] Fuller, R. B., U.S. Pat. No. 2,682,235, 29 Jun. 1954.
[6] Fuller, R. B., U.S. Pat. No. 2,986,241, 30 May 1961.
[7] A. G. Evans, J. W. Hutchinson, N. A. Fleck, M. F. Ashby and H. N. G. Wadley, *Prog. Mater. Sci.* 2001, 46, 309.
[8] G. J. Davies and S. Zhen, *J. Mat. Sci.* 1983, 18, 1899.
[9] I. Jin, L. D. Kenny and H. Sang, U.S. Pat. No. 4,973,358, 27 November 1990.
[10] D. T. Queheillalt and H. N. G. Wadley, SPIE's 9th Annual International Symposium on Smart Structures and Materials, Vol. 4698, In Press, 2002.
[11] R. B. Kaplan, U.S. Pat. No. 5,282,861, 1 Feb. 1994.
[12] H. Bart-Smith, A.-F. Bastawros, D. R. Mumm, A. G. Evans, D. J. Sypeck and H. N. G. Wadley, *Acta mater.* 1998, 46 (10), 3583.
[13] N. Wicks and J. W. Hutchinson, *Int. J. Solids and Structures* 2001, 38, 5165.
[14] V. S. Deshpande and N. A. Fleck, *Int. J. Solids and Structures* 2001, 38, 6275.
[15] S. Chiras, D. R. Mumm, A. G. Evans, N. Wicks, J. W. Hutchinson, K. Dharmasena, H. N. G. Wadley and S. Fichter, *Int. J. Solids and Structures* 2001, Accepted.

[16] I. H. Shames, *Introduction To Solid Mechanics*, Prentice-Hall, Englewood Cliffs, 1975.

[17] *Advanced Materials & Processes* 2000, 158 (6).

[18] S. T Brittain, Y. Sugimura, O. J. A. Schueller, A. G. Evans and G. M. Whitesides, *J. Microelectromechanical Systems* 2001, 10 (1), 113.

[19] S. Hyun, A. M. Karlsson, S. Torquato and A. G. Evans, *Int. J. Mechanical Sciences* 2001, Submitted.

[20] H. Bart-Smith, J. W. Hutchinson and A. G. Evans, *Int. J. Mechanical Sciences* 2001, 43, 1945.

We Claim:

1. A truss structure comprising:

N number (N>1) of vertically stacked three-dimensional space filling layers, wherein each of said three-dimensional space filling layers comprise:

an array of out-of-plane truss units, said units comprising at least three leg members, said legs being connected to each other at an upper node, and each leg terminating at a lower node distal from said upper node;

said truss units connecting to nearest laterally adjacent units at lower nodes;

said three-dimensional space filling layers having a top side and a bottom side;

wherein:

at least a portion of said top side of each of said three-dimensional space filling layers for the first through ($N^{th}$-1) layers comprises a top adjoining region;

at least a portion of said bottom side of each of said three-dimensional space filling layers for the second through ($N^{th}$) layers comprises a bottom adjoining region; and wherein each of said three-dimensional space filling layers are discretely bonded to immediate vertically adjacent three-dimensional space filling layers, wherein said discrete bonds are formed between the top adjoining region of one layer and the bottom adjoining region of an adjacent layer.

2. The truss structure of claim 1, wherein said leg members are selected from one of solid, hollow, porous or combinations thereof.

3. The truss structure of claim 2, wherein said unit trusses have a geometrical shape selected from the group consisting of: tetrahedral, pyramidal, Kagome, or combinations thereof.

4. The truss structure of claim 3, wherein said N number of vertically stacked three-dimensional space filling layers contain truss units that have different geometrical shapes with respect to at least two layers.

5. The truss structure of claim 2, wherein said hollow or solid leg members have a cross-section shape selected from the group consisting of circular, planar, elliptical, rectangular, square, triangular, polygonal, hexagonal, C-section, Z-section, I-beam, or H-beam.

6. The truss structure of claim 2, wherein the leg members are made from a material selected from the group consisting of metal, alloy, ceramic, polymer, glass, composites, and semiconductor.

7. The truss structure of claim 2, wherein the leg members are made from a material selected from the group consisting of Fe, Ni, Cr, Ga, Pd, Ag, P, Al, Cu, Ti, Ta, Mo, Pt, Mg, Be, Au, Rh, Si, Mn, Zn, V, B, Nb, W, C, Co, S, Li, Zr, Sb, Bi and alloys thereof.

8. The truss structure of claim 2, wherein the leg members are made from composites formed of one or more material selected from the group consisting of Fe, Ni, Cr, Ga, Pd, Ag, P, Al, Cu, Ti, Ta, Mo, Pt, Mg, Be, Au, Rh, Si, Mn, Zn, V, B, Nb, W, C, Co, S, Li, Zr, Sb, Bi and alloys thereof.

9. The truss structure of claim 1, further comprising:

a perimeter-oriented face sheet having an inner surface and an outer surface, wherein said inner surface is fixedly bonded to a perimeter side of at least a minority of each of said three-dimensional space filling layers.

10. The truss structure of claim 9, further comprising:

a second perimeter-oriented face sheet having an inner surface and an outer surface, wherein said inner surface is fixedly bonded to a second one of said perimeter sides of at least a minority of each of said three-dimensional space filling layers.

11. The truss structure of any one of claims 9 or 10, wherein said first and second perimeter-oriented face sheets are selected from a structure consisting of: a solid sheet, a porous sheet, a sheet containing circular apertures, a sheet containing triangular apertures, a sheet containing hexagonal apertures, a sheet containing square apertures, a sheet containing triangular perforations, a sheet containing hexagonal perforations, a sheet containing square perforations or any appropriately aperture/perforated sheet whose nodes align with those of the truss.

12. The truss structure of claim 1, wherein said N number of vertically stacked three-dimensional space filling layers may be rotated laterally relative to one another.

13. The truss structure of claim 1, further comprising:

a layer-oriented face sheet having an inner surface and an outer surface, wherein said inner surface is fixedly bonded to at least a portion of said bottom side of a first three-dimensional space filling layer.

14. The truss structure of claim 13, further comprising:

a second layer-oriented face sheet having an inner surface and an outer surface, wherein said inner surface is fixedly bonded to at least a portion of said top side of an $N^{th}$ three-dimensional space filling layer.

15. The truss structure of any one of claims 13 or 14, wherein said first and second layer-oriented face sheets are selected from a structure consisting of: a solid sheet, a porous sheet, a sheet containing circular apertures, a sheet containing triangular apertures, a sheet containing hexagonal apertures, a sheet containing square apertures, a sheet containing triangular perforations, a sheet containing hexagonal perforations, a sheet containing square perforations or any appropriately aperture/perforated sheet whose nodes align with those of the truss.

16. The truss structure of claim 1, wherein said truss units are formed from a structure consisting of: a solid sheet, a porous sheet, a sheet containing circular apertures, a sheet containing triangular apertures, a sheet containing hexagonal apertures, a sheet containing square apertures, a sheet containing triangular perforations, a sheet containing hexagonal perforations, a sheet containing square perforations or any appropriately aperture/perforated sheet whose nodes align with those of the truss.

17. The truss structure of claim 1, wherein said truss structure is curved.

18. The truss structure of claim 1, wherein said truss units are made by a combined forming and punching operation.

19. The truss structure of claim 1, wherein said bonds are formed by a bonding method selected from the group consisting of transient liquid phase bonding, solid-state diffusion bonding, brazing, soldering, chemical welding, pressing, welding, gluing, or cementing.

20. A method of making a truss structure comprising:
providing N number (N>1) of three-dimensional space filling layers, wherein each of said three-dimensional space filling layers comprise:
an array of out-of-plane truss units, said units comprising at least three leg members, said legs being connected to each other at an upper node, and each leg terminating at a lower node distal from said upper node;
said truss units connecting to nearest laterally adjacent units at lower nodes;
said three-dimensional space filling layers having a top side and a bottom side;
wherein:
at least a portion of said top side of each of said three-dimensional space filling layers for the first through ($N^{th}$-1) layers comprise a top adjoining region;
at least a portion of said bottom side of each of said three-dimensional space filling layers for the second through ($N^{th}$) layers comprise a bottom adjoining region;
contacting each of said three-dimensional space filling layers with immediate vertically adjacent three-dimensional space filling layers at respective said top adjoining region and said bottom adjoining region; and
joining each of said contacted three-dimensional space filling layers by forming a bond at said areas of contact.

21. The method of claim 20, further comprising:
providing a perimeter-oriented face sheet having an inner surface and an outer surface; and
bonding said inner surface of said face sheet to a perimeter side of at least a minority of each of said three-dimensional space filling layers, wherein said bonds are formed by a bonding method selected from the group consisting of transient liquid phase bonding, solid-state diffusion bonding, brazing, soldering, chemical welding, pressing, welding, gluing, or cementing.

22. The method of claim 21, further comprising:
providing a second perimeter-oriented face sheet having an inner surface and an outer surface; and
bonding said inner surface of said second face sheet to a second perimeter side of at least a minority of each of said three-dimensional space filling layers, wherein said bonds are formed by a bonding method selected from the group consisting of transient liquid phase bonding, solid-state diffusion bonding, brazing soldering, chemical welding, pressing, welding, gluing, or cementing.

23. The method of claim 20, further comprising:
providing a layer-oriented face sheet having an inner surface and an outer surface; and
bonding said inner surface of said face sheet to at least a portion of said bottom side of first said three-dimensional space filling layer, wherein said bonds are formed by a bonding method selected from the group consisting of transient liquid phase bonding, solid-state diffusion bonding, brazing, soldering, chemical welding, pressing, welding, gluing, or cementing.

24. The method of claim 23, further comprising:
providing a second layer-oriented face sheet having an inner surface and an outer surface; and
bonding said inner surface of said second face sheet to at least a portion of said top side of $N^{th}$ said three-dimensional space filling layer, wherein said bonds are formed by a bonding method selected from the group consisting of transient liquid phase bonding, solid-state diffusion bonding, brazing, soldering, chemical welding, pressing, welding, gluing, or cementing.

25. The method of claim 20, wherein said bonds are formed by a bonding method selected from the group consisting of transient liquid phase bonding, solid-state diffusion bonding, brazing, soldering, chemical welding, pressing, welding, gluing, or cementing.

26. A truss structure, comprising:
N number (N>1) of vertically stacked three-dimensional space filling layers, wherein each of said three-dimensional space filling layers comprise an array selected from the group consisting of elongated plates or strips and out-of-plane truss units;
each of said plates or strips being substantially planar and including a first side and second side, a first lateral edge and a second lateral edge, and a first longitudinal edge and a second longitudinal edge, and wherein at least some of said plates or strips have slotted apertures partially extending across said sides in a lateral direction;
said plates or strips intersecting with other respective plates or strips, wherein said slotted apertures at least partially allow said intersecting plates or strips to intersect therethrough so as to define an intersection segment; and
wherein at least some of said intersection segments are discretely bonded, wherein said discrete bonds are formed between said intersecting plates or strips; and
said truss units comprising at least three leg members, said legs being connected to each other at an upper node, and each leg terminating at a lower node distal from said upper node;
said truss units connecting to nearest laterally adjacent units at lower nodes;
said three-dimensional space filling layers having a top side and a bottom side;
at least a portion of said top side of each of said three-dimensional space filling layers for the first through ($N^{th}$-1) layers comprises a top adjoining region;
at least a portion of said bottom side of each of said three-dimensional space filling layers for the second through ($N^{th}$) layers comprises a bottom adjoining region; and
wherein each of said three-dimensional space filling layers are discretely bonded to immediate vertically adjacent said three-dimensional space filling layers, wherein said discrete bonds are formed between the said top adjoining region and bottom adjoining region.

* * * * *